United States Patent
Ishihara et al.

(10) Patent No.: US 6,707,394 B2
(45) Date of Patent: *Mar. 16, 2004

(54) APPARATUS, METHOD, AND COMPUTER PROGRAM PRODUCT FOR GENERATING TERRAIN CLEARANCE FLOOR ENVELOPES ABOUT A SELECTED RUNWAY

(75) Inventors: Yasuo Ishihara, Kirkland, WA (US); Scott Gremmert, Redmond, WA (US); Steven C. Johnson, Issaquah, WA (US)

(73) Assignee: Honeywell, Inc., Morristown, NJ (US)

( * ) Notice: Subject to any disclaimer, the term of this patent is extended or adjusted under 35 U.S.C. 154(b) by 5 days.

This patent is subject to a terminal disclaimer.

(21) Appl. No.: 09/496,296

(22) Filed: Feb. 1, 2000

(65) Prior Publication Data

US 2003/0206120 A1 Nov. 6, 2003

Related U.S. Application Data

(60) Provisional application No. 60/118,221, filed on Feb. 1, 1999.

(51) Int. Cl.⁷ ............................................... G08B 23/00
(52) U.S. Cl. ............................................. 340/970; 701/9
(58) Field of Search ................................. 340/961, 970, 340/963, 977; 701/4, 9, 14, 5; 342/65

(56) References Cited

U.S. PATENT DOCUMENTS

| | | | | |
|---|---|---|---|---|
| 3,715,718 A | 2/1973 | Astengo | ..................... | 340/970 |
| 3,925,751 A | 12/1975 | Bateman et al. | ............ | 340/967 |
| 3,934,221 A | 1/1976 | Bateman et al. | ............ | 340/970 |

(List continued on next page.)

FOREIGN PATENT DOCUMENTS

| | | | | |
|---|---|---|---|---|
| CA | 1033828 | 6/1978 | ................... | 343/15 |
| DE | 4304561 A | 8/1994 | ........... | B64D/45/04 |
| DE | 4327706 A1 | 2/1995 | ............ | G08G/5/04 |

(List continued on next page.)

OTHER PUBLICATIONS

GCAS Publication, provided by A/S Library Services, Source and Date Unknown, pp. 185–190.
Proctor, "Avionics Unit Eyes Expanded Markets," *Aviation Week & Space Technology*, Aug. 15, 1994, p. 41.
Proctor, "Terrain Alert Graphics Tested on cockpit Displays," *Aviation Week & Space Technology, Aug. 8, 1994*, p. 51.

(List continued on next page.)

*Primary Examiner*—Brent A. Swarthout
(74) *Attorney, Agent, or Firm*—Black, Lowe & Graham PLLC

(57) ABSTRACT

The present invention provides several apparatus, methods, and computer program products for generating a terrain clearance floor envelope for use in a ground proximity warning system. In one embodiment, the present invention includes a processor that defines a terrain clearance floor envelope having at least two boundaries. In this embodiment, the processor defines at least one of the boundaries based on a runway position quality factor, an altitude data quality factor, and an aircraft position quality factor. Using these factors, the processor of the present invention can more precisely define the boundaries of the envelope about the selected runway. Further, the processor of the present invention does not unnecessarily increase the region between the envelope and runway where no ground proximity alarms are generated. In another embodiment, the present invention includes a processor that defines the terrain clearance floor envelope to be asymmetrical, such that respective profiles of the envelope in a radial cross-section are different in at least two radial directions from a center point of the selected runway. Importantly, in one embodiment of the present invention, the processor defines end regions of the terrain clearance floor envelope adjacent to the ends of the selected runway to have a different slope profile than side regions of the terrain clearance floor envelope adjacent to the sides of the selected runway. This, in turn, allows the processor to define the end regions to reflect a landing pattern for an aircraft approaching the end of the selected runway, while also defining the side regions to reflect a flight pattern for an aircraft approaching the side of the selected runway.

27 Claims, 12 Drawing Sheets

U.S. PATENT DOCUMENTS

| | | | |
|---|---|---|---|
| 3,934,222 A | 1/1976 | Bateman et al. | 340/970 |
| 3,936,796 A | 2/1976 | Bateman et al. | 340/970 |
| 3,944,968 A | 3/1976 | Bateman et al. | 340/970 |
| 3,947,808 A | 3/1976 | Bateman | 340/970 |
| 3,947,810 A | 3/1976 | Bateman et al. | 340/970 |
| 3,958,218 A | 5/1976 | Bateman | 340/970 |
| 3,958,219 A | 5/1976 | Bateman | 340/970 |
| 4,030,065 A | 6/1977 | Bateman | 340/970 |
| 4,060,793 A | 11/1977 | Bateman | 340/970 |
| 4,063,073 A | 12/1977 | Strayer | 364/439 |
| 4,215,334 A | 7/1980 | Bateman | 340/970 |
| 4,224,669 A | 9/1980 | Brame | 364/433 |
| 4,319,218 A | 3/1982 | Bateman | 340/970 |
| 4,484,192 A | 11/1984 | Seitz et al. | 340/995 |
| 4,567,483 A | 1/1986 | Bateman et al. | 340/970 |
| 4,642,775 A | 2/1987 | Cline et al. | 364/443 |
| 4,646,244 A | 2/1987 | Bateman et al. | 364/461 |
| 4,675,823 A | 6/1987 | Noland | 364/460 |
| 4,835,537 A | 5/1989 | Manion | 340/961 |
| 4,894,655 A | 1/1990 | Joguet et al. | 340/988 |
| 4,903,212 A | 2/1990 | Yokouchi et al. | 364/449.95 |
| 4,912,645 A | 3/1990 | Kakihara et al. | 364/449.2 |
| 4,914,436 A | 4/1990 | Bateman et al. | 340/970 |
| 4,914,733 A | 4/1990 | Gralnick | 340/961 |
| 4,916,448 A | 4/1990 | Thor | 340/970 |
| 4,924,401 A | 5/1990 | Bice et al. | 364/424.015 |
| 4,947,164 A | 8/1990 | Bateman | 340/968 |
| 4,954,959 A | 9/1990 | Moroto et al. | 364/449.5 |
| 4,987,413 A | 1/1991 | Grove | 340/970 |
| 5,086,396 A | 2/1992 | Waruszewski, Jr. | 364/454 |
| 5,136,512 A | 8/1992 | Le Borne | 364/461 |
| 5,140,532 A | 8/1992 | Beckwith, Jr. et al. | 395/101 |
| 5,155,688 A | 10/1992 | Tanaka et al. | 364/454 |
| 5,157,615 A | 10/1992 | Brodegard | 364/461 |
| 5,196,847 A | 3/1993 | Bateman | 340/970 |
| 5,202,690 A | 4/1993 | Frederick | 342/26 |
| 5,220,322 A | 6/1993 | Bateman et al. | 370/970 |
| 5,252,978 A | 10/1993 | Priestley | 342/29 |
| 5,257,195 A | 10/1993 | Hirata | 364/449.95 |
| 5,265,025 A | 11/1993 | Hirata | 364/449.7 |
| 5,285,391 A | 2/1994 | Smith, Jr. et al. | 364/443 |
| 5,293,163 A | 3/1994 | Kakihara et al. | 340/995 |
| 5,293,318 A | 3/1994 | Fukushima | 364/449.95 |
| 5,337,242 A | 8/1994 | Yamamoto et al. | 364/449.2 |
| 5,414,631 A | 5/1995 | Denoize et al. | 364/461 |
| 5,442,556 A | 8/1995 | Boyes et al. | 364/461 |
| 5,486,821 A | 1/1996 | Stevens et al. | 340/970 |
| 5,488,563 A | 1/1996 | Chazelle et al. | 364/461 |
| 5,495,249 A | 2/1996 | Chazelle et al. | 342/36 |
| 5,519,392 A | 5/1996 | Oder et al. | 340/995 |
| 5,526,000 A | 6/1996 | Chazelle et al. | 342/407 |
| 5,581,259 A | 12/1996 | Schipper | 342/451 |
| 5,608,392 A | 3/1997 | Faivre et al. | 340/967 |
| 5,638,282 A | 6/1997 | Chazelle et al. | 364/461 |
| 5,661,486 A | 8/1997 | Faivre et al. | 342/33 |
| 5,677,842 A | 10/1997 | Denoize et al. | 364/461 |
| 5,798,712 A | 8/1998 | Coquin | 340/970 |
| 5,839,080 A | 11/1998 | Muller et al. | 701/9 |
| 6,304,800 B1 * | 10/2001 | Ishihara et al. | 340/947 |

FOREIGN PATENT DOCUMENTS

| | | | | |
|---|---|---|---|---|
| EP | 0790487 A2 | 8/1987 | | G01C/23/00 |
| FR | 2 548 188 A1 | 7/1984 | | G01S/1/18 |
| FR | 2689668 | 10/1993 | | G08G/5/04 |
| FR | 2721130 | 12/1995 | | G08G/5/04 |
| GB | 2 266 286 A | 10/1993 | | B64D/45/04 |
| WO | WO 85/03566 | 8/1985 | | G01C/5/00 |

OTHER PUBLICATIONS

Kerrill, Tamara, "Satellite–Guided Airplane Flies Right Into the Future," *Chicago Sun–Times*, Oct. 28, 1994, p. 22.

Malm, Richard, "Engineers Can Tap Into Global Positioning System" *Engineering Times*, Apr., 1995, pp. 11–14.

Burnham and Kline, "Airborne Electronic Terrain Map System, Part 2–Applications," *IEEE*, 786–789, 1981.

Sander, "Algorithms for an Adaptive Dynamic Window in Electronic Map systems," Air Force Wright Aeronautical Laboratories.

Weber and Opttek, "Airborne Electronic Terrain Map System," *IEEE*, 773–778, 1981.

Small, "The Electronic Terrain Map—A New Avionics Integrator –," Avionics Laboratory, Wright–Patterson Air Force Base, Ohio, 356–359.

Tang and Mealy, "Application of Multiple Model Estimation Techniques to a Recursive Terrain Height Correlation System," *IEEE*, 757–764, 1981.

Woodward and Hoover, "Passive Terrain Following Using Stored Map and Global Positioning System," *IEEE*, 779–785, 1981.

"Air Force Evaluating Model of Electronic Map Technology," *Aviation Week & space Technology*, 76, Dec. 19, 1983.

Kuchar and Hansman, Jr., "An Exploratory Study of Plan--View Terrain Displays for Air Carrier Operations," *The International Journal of Aviation Psychology*, 3(1):39–54, 1993.

Paper re: Proceedings of the National Technical Meeting, The Institute of Navigation, Anaheim, California dated Jan. 20–23, 1987 (4 pages).

Paper re: A New Approach to CFIT Prevention: GCAS Ground Collision Avoidance System, Dassault Electronique, Rockwell Avionics, Author: Jean–Francis Manfroy and Lothar J. Taylor dated 11/95 (12 pages).

The F–16 Digital Terrain System, British Aerospace, The Institute of Electrical Engineers, 1995.

"Terrain Databases and Their Use In Navigation and Collision Avoidance," Institute of Electrical Engineers, Electronics Division Colloquim, Professional Group E15, Radar Sonar and Navigation Systems, *Digest No. 1995/066*, 1995, paper by Allerton.

Kuchar and Hansman, Jr., "Part–Task Simulation Study of Candidate Terrain Alerting Displays," Department of Aeronautics and Astronautics, Massachusetts Institute of Technology, Jun. 30, 1993.

Kuchar and Hansman, Jr., "Advanced Terrain Displays for Transport Category Aircraft," ASL, Departments of Aeronautics & Astronautics, Massachusetts Institute of Technology, Aug. 23, 1991.

"The Future Flight Deck," The Flight Operations Group of the Royal Aeronautical Society and The Guild of Air Pilots and Air Navigators of London.

Hewitt et al., "A Ground and Obstacle Collision Avoidance Technique (GOCAT)," *IEEE*, May, 1991.

Moore, "We Have the Technology," *Flying Safety*, Jun., 1992.

Hughes, "Glass Cockpit Study Reveals Human Factors Problems," *Aviation Week & Space Technology*, Aug. 7, 1989.

Hoffman and Burnham, "Airborne Electronic Map systems," *IEEE*, 769–772, 1981.

Moller and Sachs, "Synthetic Vision for Enhancing Poor Visibility Flight Operations," *IEEE AES Systems*:27–42, 1994.

Rueb, et al., "Evaluation of the C/EC/KC–135 Ground Collision Avoidance System (GCAS) (Study 2)," *Integrated Engineering and Tech. Management Directorate*, Wright–Patterson AFB, Final Report, 1993.

Shah, "Ground Collision Warning System Performance Criteria for High Maneuverability Aircraft," *Flight Stability and Control Branch* Wright Patterson AFB, 1988.

Stevens, "Terprom Helps Low–Altitude Flight,: Terrain–Navigation System for Flying at Low Height," *Elektronica* 1986, (Dutch) w/English Transl.

"Safety Through Interactions and International Standards," *Proceedings of the Flight Safety Foundation*, 46th Annual International Air Safety Seminar, Kuala Lumpuir, Malaysia, 1993.

Williams and Mitchell, "Effects of Integrated Flight Path and Terrain Displays on Controlled Flight into Terrain," Center for Human–Machine Systems Research, School of Industrial and Systems Engineering, Georgia Institute of Technology.

Young, "Warning System Concepts to Prevent Controlled Flight Into Terrain (CFIT)," *Defense Systems & Electronics Group*, Texas Instruments, Inc. IEEE, 1993.

"Technology and Air Attack," *Asian Defense Journal*, 1993, Computer Printout.

Fitzsimmons, "First moves towards an "intelligent" GPWS," *Interavia/Aerospace World*, 1993.

Grey and Dale, "Advances in Techniques and Technologies for Air Vehicle Navigation and Guidance," *NATO Advisory Group for Aerospace Research and Development (AGARD)*, Guidance and Control Panel 48th Symposium, 1989.

Hewitt, "The Use of Terrain Databased for Avionic Systems," *The Institution of Electrical Engineers*, 1995.

Hopkins et al., "Quo Vadis?," *Flight International* 11–17:37–40, Mar. 1992.

"GCAS—Past, Present and Future of Alert Systems for Abnormal Closure to Ground," *Abstract*, 1993, translation by Kei Kino. (Japanese Article with English Translation).

Kuchar and Hansman, Jr., "Part–Task Simulator Evaluations of Advanced Terrain Display," Preprints, SAE Aerotech Conference and Exposition, Anaheim, CA, 1993.

Lawrence, "Modern Inertial Technology," Springer–Verlag New York, Inc., 1993.

LeBorn, "A Generic Ground Collision Avoidance System for Tactical Aircraft," *Cubic Defense Systems*, San Diego, California. IEEE National Aerospace and Electronics Conference, 1988.

Bennett and Cockburn, "Pilot Monitoring of Display Enhancements Generated From A Digital Data Base," *AGARD Conference Proceedings No. 456*, 1990.

Bennett, "The Use of Digital Map Data to Provide Enhanced Navigation and Displays for Poor Weather Penetration and Recovery," *GEC Marconi Avionics*, 1993.

Bice, "Development of an Automated Ground Collision Avoidance System Using A Digital Terrain Database," *Wright Patterson AFB*, 1989.

DiPadua et al., "Comparison of the General Dynamics Ground Clobber Algorithm with the GCAS and Laws Algorithms," *Crew Station Design Facility, Wright Patterson AFB*, 1988.

Fitzgerald and Brunner, "Use of High–Fidelity Simulation in the Developments of an F/A–18 Active Ground Collision Avoidance System," *SAE International*, 1992.

Baldwin et al. "GPS–Based terrain Avoidance Systems—A Solution for General Aviation Controlled Flight into Terrain," *Rannoch Corporation*, (date unknown).

Bateman, "How to Terrain–proof the World's Airline Fleet," *Sundstrand Data Control. Flight Safety Foundation*, 44th IASS, Singapore, 1991.

* cited by examiner

APPARATUS, METHOD, AND COMPUTER PROGRAM PRODUCT FOR GENERATING TERRAIN CLEARANCE FLOOR ENVELOPES ABOUT A SELECTED RUNWAY

RELATED APPLICATIONS

The present application claims priority from U.S. Provisional Application Ser. No. 60/118,221 entitled TERRAIN CLEARANCE FLOOR ALERTING ALGORITHM filed Feb. 1, 1999, the contents of which are incorporated herein by reference.

FIELD OF THE INVENTION

The present invention relates generally to ground proximity warning systems for use in aircraft. More particularly, the apparatus, methods, and computer program products of the present invention relate to generating a terrain clearance floor envelope about a selected runway for use by a ground proximity warning system to provide appropriate ground proximity warning alerts.

BACKGROUND OF THE INVENTION

An important advancement in aircraft flight safety has been the development of ground proximity warning systems. These warning systems analyze the flight parameters of the aircraft and the terrain surrounding the aircraft. Based on this analysis, these warning systems provide alerts to the flight crew concerning possible inadvertent collisions with terrain or other obstacles. Further, these ground proximity warning systems ensure that the aircraft maintains a minimum altitude with regard to terrain underlying the aircraft.

For example, one ground proximity warning system has been developed that generates terrain caution and warning envelopes that extend forward of the aircraft based on the position and flight parameters of the aircraft. Terrain and obstacles that pierce the terrain caution and warning envelopes are displayed to the flight crew as potential ground proximity problems by appropriate alarms or warnings. Further, and importantly, the ground proximity warning system also generates terrain clearance floor envelopes that provide minimum altitudes that the aircraft should maintain above terrain underlying the aircraft. If the altitude of the aircraft with respect to the underlying terrain, is less than the minimum altitude required by the terrain clearance floor envelope, the ground proximity warning system will provide appropriate alerts.

These ground proximity warning systems are quite useful in providing the flight crew with information concerning potential problems with the navigation of the aircraft. However, the usefulness of these systems must be balanced against problems associated with providing false alerts to the flight crew that may cause the flight crew to ignore alarms from the ground proximity warning system altogether. For example, during the landing operation of the aircraft, the aircraft will follow a flight path that will eventually intersect the earth at the intended runway on which the aircraft is scheduled to land. In the landing operation, ground proximity warning systems, if not adequately controlled, may generate constant alarms. The constant generation of alarms during landing may be a nuisance due to the added stress and confusion the alarms may impose on the flight crew. Additionally, the nuisance alarms may overshadow other critical alarms in the cockpit.

For this reason, at least one ground proximity warning system has been designed to alter the terrain clearance floor envelopes as the aircraft approaches a selected runway. The terrain clearance floor envelope is altered to reflect a landing pattern of the aircraft. As the aircraft descends toward the runway during landing, the ground proximity warning system provides ground proximity alerts based on the modified terrain clearance floor envelope. As such, the ground proximity warning system provides ground proximity warning protection, while at the same time reducing the number of nuisance alarms.

An example of such a ground proximity warning system is described in the following patents: 1) U.S. Pat. No. 5,839,080 to Muller et al. entitled "Terrain Awareness System," 2) U.S. Pat. No. 4,914,436 to Bateman et al. entitled "Ground Proximity Approach Warning System Without Landing Flap, and 3) U.S. Pat. No. 3,922,637 to Bateman, entitled "Aircraft Landing Approach Ground Proximity Warning System." These patents are incorporated herein by reference.

With reference to FIG. 1, the ground proximity warning system described in the above references generates a terrain clearance floor envelope 10 about a selected runway 12. The envelope is typically centered about the selected runway and is typically conical or bowl shaped. The terrain clearance floor envelope has an inner 14 and an outer 22 boundary. As the envelope converges from the outer to the inner boundary, the terrain clearance floor envelope typically decreases in altitude. Further, the terrain clearance floor envelope may include differing slope portions that provide different slopes at different distances from the selected runway. The different sloped portions and their respective distances from the selected runway are chosen to provide desired ground proximity protection, while at the same time reducing the number of nuisance alerts. Beyond the outer boundary, the ground proximity warning system generates a terrain clearance floor envelope 24 that has a constant minimum altitude that the aircraft should maintain above underlying terrain.

An important aspect of the terrain clearance floor envelope is the inner boundary that is proximate to the selected runway. The inner boundary 14 defines a boundary at which the ground proximity warning system ceases to generate ground proximity warning alerts. Cessation in the generation of ground proximity alerts at the inner boundary is important to eliminate the number of nuisance alarms provided to the flight crew during the final approach of the aircraft to the selected runway. The distance between the selected runway and the inner boundary is used to define the distances of the differing slope portions from the selected runway and the location of the outer boundary from the selected runway.

Ideally, the inner boundary would be located as close as possible to the perimeter of the selected runway to thereby provide ground proximity warning protection until the aircraft lands on the selected runway. However, the inner boundary should not overlap with the perimeter of the selected runway, as it may cause the ground proximity warning system to provide nuisance alarms during the final approach of the aircraft. In reality, however, precise determination of the location of the inner boundary may be difficult.

Specifically, the determination of the location of the inner boundary is typically based on the coordinate position of the selected runway and the coordinate position and altitude of the aircraft. However, there are typically data uncertainties associated with the indications of the present position of the aircraft and the coordinate position of the selected runway. These uncertainties make it difficult to locate the inner boundary of the terrain clearance floor envelope in close proximity to the outer perimeter of the selected runway while not overlapping the perimeter of the selected runway.

For this reason, the conventional ground proximity warning system described above typically determines an aircraft position uncertainty factor representing an uncertainty in the coordinate position of the aircraft. The conventional ground proximity warning system typically adds to the aircraft position uncertainty of the aircraft a predetermined buffer distance that is the same for all runways. This added buffer distance is typically 1 nm and is selected to provide a more conservative estimate of the location of the inner boundary, such that the inner boundary does not overlap the perimeter of the selected runway. Additionally, the conventional ground proximity warning system typically locates the inner boundary at a preselected altitude representing a minimum altitude that the aircraft should maintain above underlying terrain at the inner boundary. In light of this selected buffer distance, the distance 16 between the inner boundary and the selected runway defines a region in which the ground proximity warning system does not provide ground proximity alarms. It would be desirable to provide a ground proximity warning system that more precisely defines the location of the inner boundary to thereby not unnecessarily enlarge this region between the inner boundary and the selected runway.

The approach used by the conventional ground proximity warning system to accommodate for errors is somewhat advantageous as it determines the location of the inner boundary based on coordinate positional errors associated with the aircraft, i.e., error in the longitude and latitude. However, this approach fails to account for other determinable errors that may make the determination of the inner boundary more precise. Specifically, the preselected buffer distance used by the conventional ground proximity warning system is not chosen based on the specific factors associated with the selected runway. Instead, it is a predetermined distance used for all selected runways. Further, the conventional ground proximity system does not account for errors associated with the indicated altitude of the aircraft. As it is typically advantageous to define the inner boundary to provide ground proximity warning protection as close to the runway as possible without providing nuisance alarms, it would be desirable to provide a ground proximity warning system that more precisely determines the location of the inner boundary.

As also illustrated in FIG. 1, the conventional ground proximity warning system generates a terrain clearance floor envelope that is circular in shape. While the use of a circular envelope generated about the runway may provide a desired terrain clearance floor envelope for an aircraft approaching the ends of the selected runway, it may not be appropriate for an aircraft approaching the sides of the runway. For instance, with reference to the inner boundary 14 of the terrain clearance floor envelope, the distance between the inner boundary and the ends of the runway, distance 18, is smaller than the distance from the sides of the selected runway, distance 16. As such, the region in which ground proximity warnings are not generated is smaller for the ends of the runway than for the sides of the runway. This is problematic for aircraft that fly crossways over the selected runway or that fly alongside the selected runway instead of approaching from the end of the selected runway.

As also shown in FIG. 1, the conventional ground proximity warning system generates a terrain clearance floor envelope that has a radial cross-section that is the same for all points about the selected runway. Specifically, the terrain clearance floor envelope is typically conical or bowl shaped and has the same cross-sectional slope profile for all portions of the envelope. Further, the cross-sectional profile is selected to reflect a landing pattern of an aircraft at the ends of the selected runway. It is not selected, however, based on a flight pattern of an aircraft that is approaching from a side of the selected runway or is flying to the left or right of the center lengthwise axis 20 of the selected runway. In light of this, it would be desirable to provide a ground proximity warning system that defines the location of the portions of the inner boundary adjacent to the sides of the selected runway differently than the portions of the inner boundary adjacent to the ends of the selected runway.

SUMMARY OF THE INVENTION

As set forth below, the apparatus, methods, and computer program products of the present invention overcome many of the deficiencies identified with defining a terrain clearance floor envelope about a selected runway. For example, in one embodiment, the present invention provides apparatus, methods, and computer program products that define a terrain clearance floor envelope based on not only errors associated with the indicated coordinate position of the aircraft, but also on errors associated with the position of the selected runway and errors associated with the indicated altitude of the aircraft. By using error factors associated with the indicated position of the selected runway and the error associated with the indicated altitude of the aircraft, as opposed to a preselected buffer distance, the location of the inner boundary of the terrain clearance floor envelope may be more precisely determined.

The apparatus of this embodiment includes a processor that generates a terrain clearance floor envelope about a selected runway. In operation, the processor defines the terrain clearance floor envelope by at least two boundaries, where at least one of the boundaries is defined by at least one of a runway position quality factor and an altitude data quality factor. In this embodiment, the processor receives either one or both factors concerning uncertainties in the indicated location of the selected runway and/or uncertainties in the indicated altitude of the aircraft. The processor uses either one or both of these uncertainties in determining at least one of the boundaries of the terrain clearance floor envelope.

For instance, in one embodiment of the present invention, the processor defines the inner boundary of the terrain clearance floor envelope based on the summation of the runway position quality factor associated with the selected runway and the altitude data quality factor and position uncertainty factor representing an uncertainty in the indicated altitude and indicated coordinate position of the aircraft, respectively. This, in turn, provides a terrain clearance floor envelope having an inner boundary that is more precisely located with respect to the selected runway to thereby not unnecessarily enlarge the region where no ground proximity warning alarms are generated.

As discussed above, in one embodiment of the present invention, the apparatus and method of the present invention determine the inner boundary based on an altitude data quality factor. In one embodiment of the present invention, the altitude data quality factor is a horizontal distance representing an uncertainty in the altitude of the aircraft. In this embodiment of the present invention, the processor generates the altitude data quality factor by dividing the uncertainty in the altitude of the aircraft by the tangent of a predetermined glideslope angle.

As also discussed, the processor of the present embodiment defines the terrain clearance floor envelope based on at least two boundaries. In one embodiment of the present invention, the processor defines the terrain clearance floor envelope based on both an inner and outer boundary. In this embodiment, the processor defines the inner boundary at a distance from the end of the selected runway equal to the sum of the runway position quality factor, the altitude data quality factor, and the aircraft position quality factor. The processor further defines the outer boundary of the terrain clearance floor envelope at a distance from the end of the selected runway equal to the sum of the runway position quality factor, the altitude data quality factor, the aircraft position quality factor, and a predetermined outer distance representing a predetermined distance from the inner boundary. The processor may also further define the terrain clearance floor envelope by at least one intermediate boundary. In this embodiment, the processor defines the intermediate boundary at a location from the end of selected runway equal to the sum of the runway position quality factor, the altitude data quality factor, the aircraft position quality factor, and a predetermined intermediate distance representing a predetermined intermediate distance from the inner boundary.

In addition to defining the terrain clearance floor envelope based on a distance between an inner and outer boundary, the present invention may also define the terrain clearance floor envelope to have at least one slope decreasing from the outer to the inner boundary to define a landing pattern of the aircraft. In this embodiment of the present invention, the processor first defines the inner boundary to have a preselected inner boundary altitude. The processor also defines the outer boundary to have an outer boundary altitude. The inner boundary and outer boundary altitudes represent minimum altitudes that the aircraft should maintain above terrain underlying the aircraft at the inner and outer boundary distances, respectively. This, in turn, defines a terrain clearance floor envelope that has a slope from the outer to the inner boundary to define a landing pattern of the aircraft. In a further embodiment, the processor may define one or several intermediate boundaries located at different intermediate boundary altitudes. In this embodiment of the present invention, the processor defines a terrain clearance floor envelope having a plurality of slopes from the outer boundary through the intermediate boundaries to the inner boundary to define a landing pattern of the aircraft.

In addition to more precisely defining the inner boundary of the terrain clearance floor envelope so as to not unnecessarily enlarge the region where ground proximity alarms are not generated, the present invention also provides apparatus, methods, and computer program products that define an asymmetrical terrain clearance floor envelope about the selected runway. In this embodiment of the present invention, the apparatus includes a processor that defines the terrain clearance floor envelope such that respective profiles of the envelope in a radial cross-section are different in at least two radial directions from a center point of the selected runway.

Specifically, in one embodiment, the apparatus, methods, and computer program products of the present invention provide a desired landing terrain clearance floor envelope for aircraft approaching the ends of the selected runway, while also providing a desired terrain clearance floor envelope for aircraft approaching the sides of the selected runway. In this embodiment, the processor defines a terrain clearance floor envelope having a different cross-sectional altitude and slope profile for portions of the envelope adjacent to the sides of the selected runway than for portions of the envelope adjacent to the ends of the selected runway.

For instance, in one embodiment of the present invention, the processor defines a portion of the terrain clearance floor envelope adjacent to the sides of the selected runway and proximate to the inner boundary to have a constant preselected altitude. The constant preselected altitude represents a minimum altitude that the aircraft should maintain above terrain underlying the aircraft in this portion of the envelope. This provides a heighten terrain clearance floor envelope for providing ground proximity warnings to an aircraft approaching from the side of the selected runway. The processor of this embodiment also defines a portion of the terrain clearance floor envelope adjacent to the ends of the selected runway to have a slope representative of the landing pattern of the aircraft, such that the ground proximity warning system provides appropriate ground proximity alerts for aircraft approaching the ends of the selected runway.

In addition to defining the terrain clearance floor envelope to have side portions adjacent of the sides of the selected runway with different slopes than portions adjacent to the ends of the selected runway, the processor of the present invention may also define the shape of the different portions of the terrain clearance floor envelope. For example, in one embodiment, the processor may define the shape of the end portions of the terrain clearance floor envelope adjacent to the end of the selected runway to represent various horizontal angles, (i.e., bearing angles), at which the aircraft may land on the selected runway. In this embodiment, the processor defines the end regions of the terrain clearance floor envelope to have a first portion with converging sides that converge from a first width to a second smaller width. This portion of the end region is formed to account for different horizontal angles at which the aircraft may approach the selected runway, (i.e., the bearing angle of the aircraft with respect to the runway). The processor of this embodiment may also define a second portion having parallel sides spaced apart by the second width and extending from the converging sides of the first portion toward the end of the selected runway. This portion of the end region defines an area nearer the end of the selected runway in which the aircraft is typically more aligned with the lengthwise axis of the selected runway on its final landing approach.

In addition to providing a terrain clearance floor envelope having a more precisely located inner boundary and an asymmetrical terrain clearance floor envelope having different cross-sectional altitude profiles, the present invention also includes apparatus, methods, and computer program products that generate a terrain clearance floor envelope having a non-circular inner boundary. For instance, in one embodiment of the present invention, the processor defines portions of the inner boundary adjacent to the sides of the selected runway differently from portions adjacent to the ends of the selected runway. This is important as the processor may locate the portions of the inner boundary adjacent to the sides of the selected runway closer to the sides of the runway than would be possible with a circular inner boundary.

As an example, in one embodiment of the present invention, the processor defines the end portions of the inner boundary as an arc having a radius equal to the sum of a runway position quality factor and an altitude data quality factor from an end point of the selected runway. In this embodiment, the processor also defines the side portions of the inner boundary as lines that are parallel to a lengthwise axis of the selected runway and spaced apart from the side of the selected runway by the sum of a runway position quality factor and an altitude data quality factor. As such, the end profiles of the inner boundary of this embodiment are shaped to accommodate for differing horizontal approach angles that the aircraft may have with respect to the selected runway during landing. Additionally, the side portions are located nearer to the sides of the selected runway to provide increased ground proximity warning protection for aircraft approaching the side of the selected runway.

In addition to providing apparatus and methods for defining the terrain clearance floor envelopes of the various embodiments mentioned above, the present invention also provides computer program products. The computer programs products include a computer readable storage medium having computer readable program code means embodied in the medium. The computer-readable program code means includes various computer instruction means for defining the terrain clearance floor envelopes described above in conjunction with the various apparatus and methods of the present invention.

DETAILED DESCRIPTION OF THE INVENTION

Figure 1:
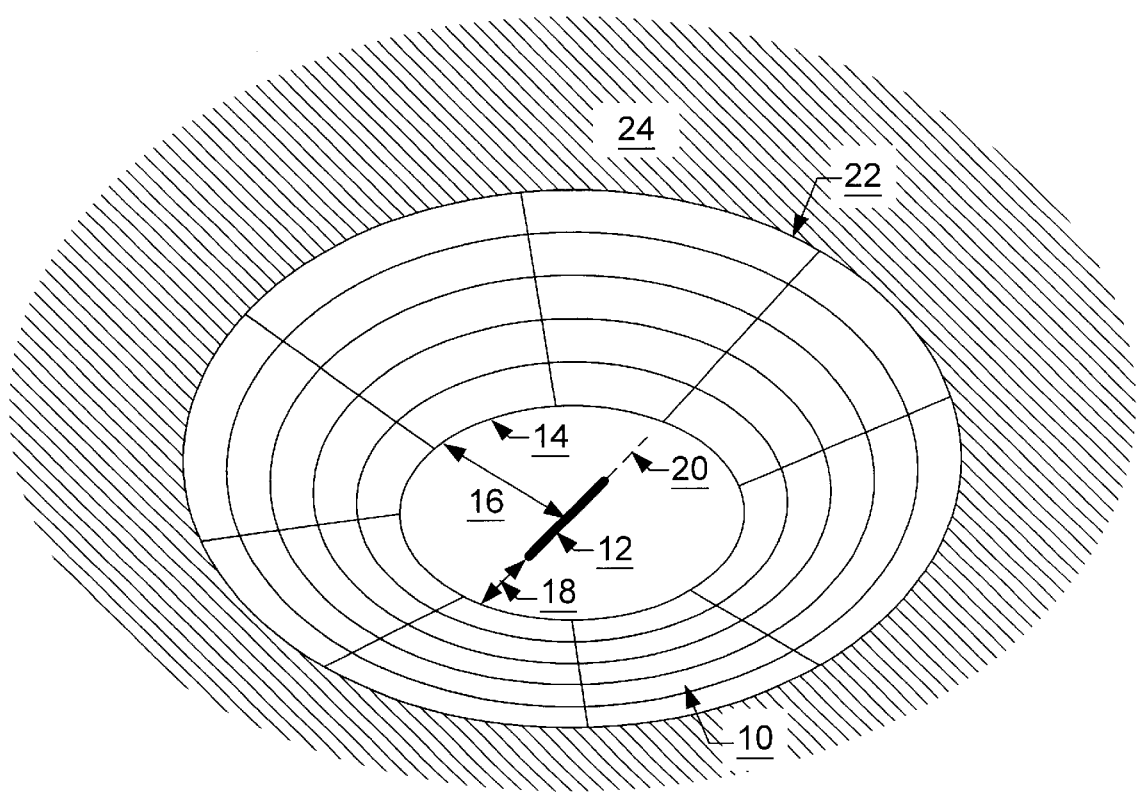
FIG. 1 is a perspective view illustrating graphically a terrain clearance floor envelope generated about a selected runway.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed above, the present invention provides several apparatus, methods, and computer program products for defining a terrain clearance floor envelope about a selected runway. Importantly, the apparatus, methods, and computer program products of the present invention define the terrain clearance floor envelope based on either one or a combination of the following factors: 1) an aircraft position uncertainty factor, 2) a runway position quality factor, and 3) an altitude data quality factor. Using one or all of these factors, the apparatus, methods, and computer program products of the present invention can more precisely define the location of inner boundary of the terrain clearance floor envelope. Further, the apparatus, methods, and computer program products of the present invention do not unnecessarily increase the area in which the ground proximity warning systems does not generate alarms.

Additionally, the apparatus, methods, and computer program products of the present invention in differing embodiments alter the profile and shape of the terrain clearance floor envelope. For instance, the apparatus, methods, and computer program products of the present invention may alter the terrain clearance floor envelope such that it has different cross-sectional slope profiles for the regions adjacent to the sides of the selected runway than for regions adjacent to the ends of the selected runway. Further, the apparatus, methods, and computer program products of the present invention may define the location of the inner boundary of the terrain clearance envelope differently for the sides of the selected runway than for the ends of the selected runway. This, in turn, allows the ground proximity warning system to provide different ground proximity warning protection for aircraft approaching the sides of the selected runway than for aircraft approaching the ends of the selected runway.

For illustrative purposes, the various apparatus, methods, and computer program products of the present invention are illustrated and described below in conjunction with the ground proximity warning system of U.S. Pat. No. 5,839,080 to Muller, entitled "Terrain Awareness System." The contents of U.S. Pat. No. 5,839,080 are incorporated herein by reference. It should be apparent, however, that the apparatus, methods, and computer program products of the present invention can be used either independently or in combination with other systems, if so desired.

Figure 2:
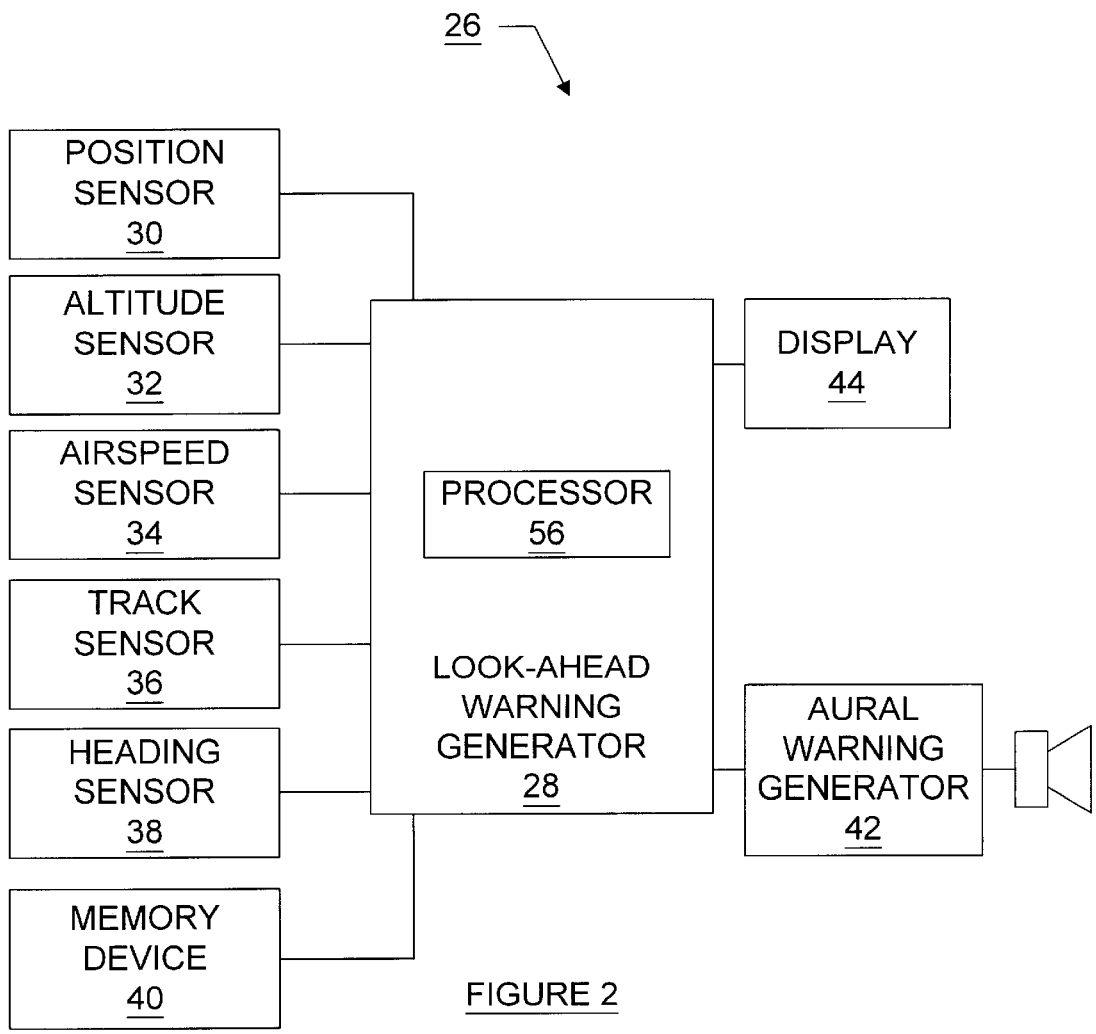
FIG. 2 is a block diagram of an apparatus for defining a terrain clearance floor envelope about a selected runway according to one embodiment of the present invention.

FIG. 2 depicts many of the components of the ground proximity warning system of U.S. Pat. No. 5,839,080 in simplified block form for illustrative purposes, however, it is understood that the functions of these blocks are consistent with and contain many of the same components as the ground proximity warning system described in U.S. Pat. No. 5,839,080. The ground proximity warning system 26 includes a look-ahead warning generator 28 that analyzes terrain and aircraft data and generates terrain clearance floor envelope profiles surrounding the aircraft. Based on these terrain profiles and the position, track, and ground speed of the aircraft, the look-ahead warning generator generates aural and/or visual warning alarms related to the proximity of the aircraft to the surrounding terrain. Some of the sensors that provide the look-ahead warning generator with data input concerning the aircraft are depicted. Specifically, the look-ahead warning generator receives positional data from a position sensor 30. The position sensor may be a portion of a global positioning system (GPS), inertial navigation system (INS), or flight management system (FMS). The look-ahead warning generator also receives altitude and airspeed data from an altitude sensor 32 and airspeed sensor 34, respectively, and aircraft track and heading information from track 36 and heading 38 sensors, respectively.

In addition to receiving data concerning the aircraft, the look-ahead warning system also receives data concerning the terrain surrounding the aircraft. Specifically, the look-ahead warning generator is also connected to a memory device 40 that contains a searchable data base of data relating, among other things, to the position and elevation of various terrain features and also elevation, position, and quality information concerning runways.

In normal operation, the look-ahead warning generator receives data concerning the aircraft from the various sensors. Additionally, the look-ahead warning generator accesses terrain and airport information from the memory device concerning the terrain surrounding the aircraft and a selected runway-typically the runway that is closest in proximity to the aircraft's current position or a determined or predicted runway. Based on the current position, distance to the selected runway, altitude, speed, track, etc. of the aircraft, the look-ahead warning generator generates terrain advisory and warning envelopes and generates alerts via either an aural warning generator 42 and/or a display 44 as to terrain or other obstacles that penetrate the terrain advisory and warning envelopes. In addition, the look-ahead warning generator generates a terrain clearance floor envelope representing minimum altitudes that the aircraft should maintain above terrain underlying the aircraft for different respective distances from the selected runway. The look-ahead warning generator produces alerts if the aircraft falls below the terrain clearance floor envelope.

Importantly, as described previously, as the aircraft nears the selected runway, the conventional ground proximity warning system alters the terrain clearance floor envelopes to represent a landing pattern of the aircraft, so as to reduce nuisance alarms, while still providing ground proximity warning protection. The present invention provides apparatus, methods and computer program products for generating the terrain clearance floor envelope about the selected runway for use in this and other ground proximity warning systems. The various embodiments of the present invention are discussed in detail below.

With regard to the disclosure below, it must first be noted that the present invention generates the terrain clearance floor envelope about a runway selected by the ground proximity warning system in which the present invention is used. For example, the conventional ground proximity warning system described in U.S. Pat. No. 5,839,080 to Muller typically selects the runway closest to the aircraft for ground proximity warning calculations. However, a more recent ground proximity warning system has been developed, which predicts the runway on which the aircraft is most likely to land and subsequently uses this predicted runway for ground proximity warning calculations. This ground proximity warning system is described in U.S. patent application Ser. No. ?,???,??? to Ishihara and Gremmert, entitled "Methods, Apparatus And Computer Program Products For Automated Runway Selection." This patent application is assigned to the assignee of the present application and is incorporated herein by reference.

In the following discussion, the term selected runway is meant to describe the runway selected by either of the above methods or any other methods used by ground proximity warning systems to select a runway for generation of terrain clearance floor envelopes. However, it must be further noted that use of the runway prediction method described in U.S. patent application Ser. No. ?,???,??? to Ishihara and Gremmert may be preferred for use in the present invention. Specifically, the runway prediction method typically provides the apparatus, methods, and computer program products of the present invention with the runway on which the aircraft is most likely to land for use in generating the terrain clearance floor envelope.

Further, it must be noted in the description below that some of the errors used in defining the envelope may be described with different, albeit somewhat similar names. For instance, the runway position quality factor is sometimes referred to as runway position uncertainty; the altitude data quality factor is sometimes referred to as altitude position uncertainty or vertical figure of merit (VFOM); and the aircraft position uncertainty factor is sometimes referred to as position uncertainty, aircraft position uncertainty or horizontal figure of merit (HFOM).

With regard to the present invention, as previously described, at least one conventional ground proximity warning system defines the inner boundary of a terrain clearance floor envelope based on a position uncertainty factor representing an uncertainty in the indicated position of the aircraft and a preselected buffer distance. This determination is illustrated graphically in FIG. 3A. Specifically, the conventional ground proximity warning system receives the aircraft position uncertainty factor 46 and adds to this factor a preselected buffer distance 48 and the half-length L of the selected runway 50. This combined length defines a radius of the inner boundary 14 of the terrain clearance floor envelope centered about the center of the selected runway 12.

Figure 3A:
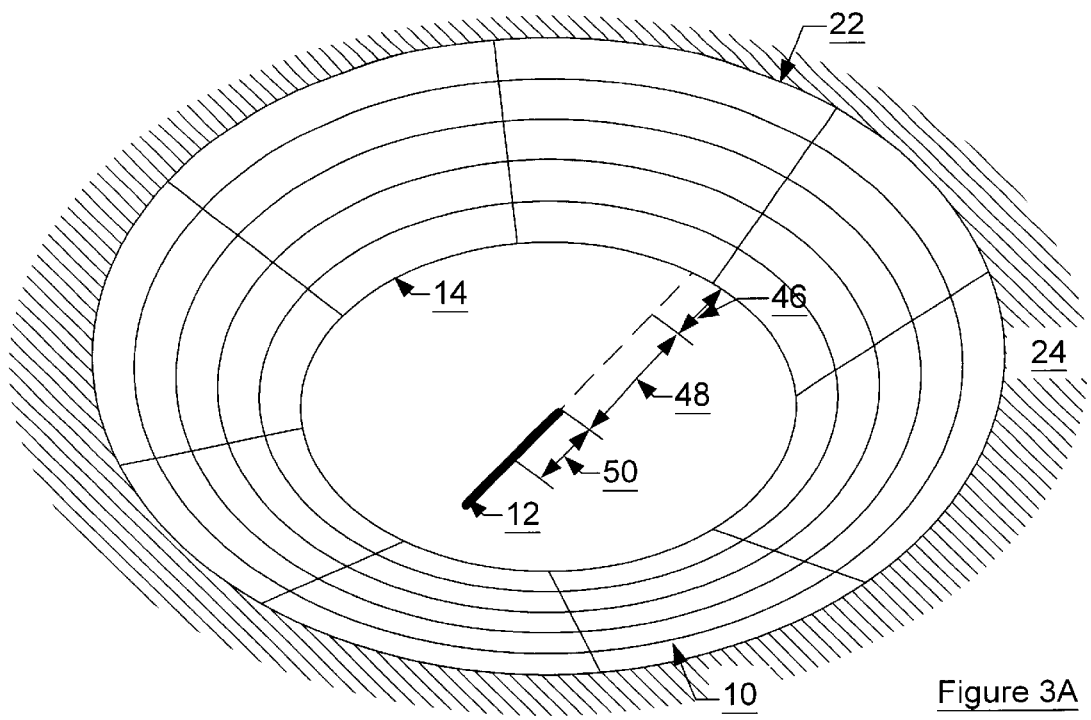
FIG. 3A is a perspective view illustrating graphically a terrain clearance floor envelope generated about a selected runway by a conventional ground proximity warning system.

As discussed previously, there may be other errors associated both with the indicated position of the selected runway and the indicated altitude of the aircraft. However, as illustrated in FIG. 3A, the conventional ground proximity warning system does not specifically include these runway position and aircraft altitude errors in the determination of the location of the inner boundary. Instead, the conventional ground proximity warning system uses the same preselected buffer distance for all selected runways. As such, the conventional system does not "modulate" the inner boundary based on the specific selected runway or the errors in the indicated altitude of the aircraft.

Figure 3B:
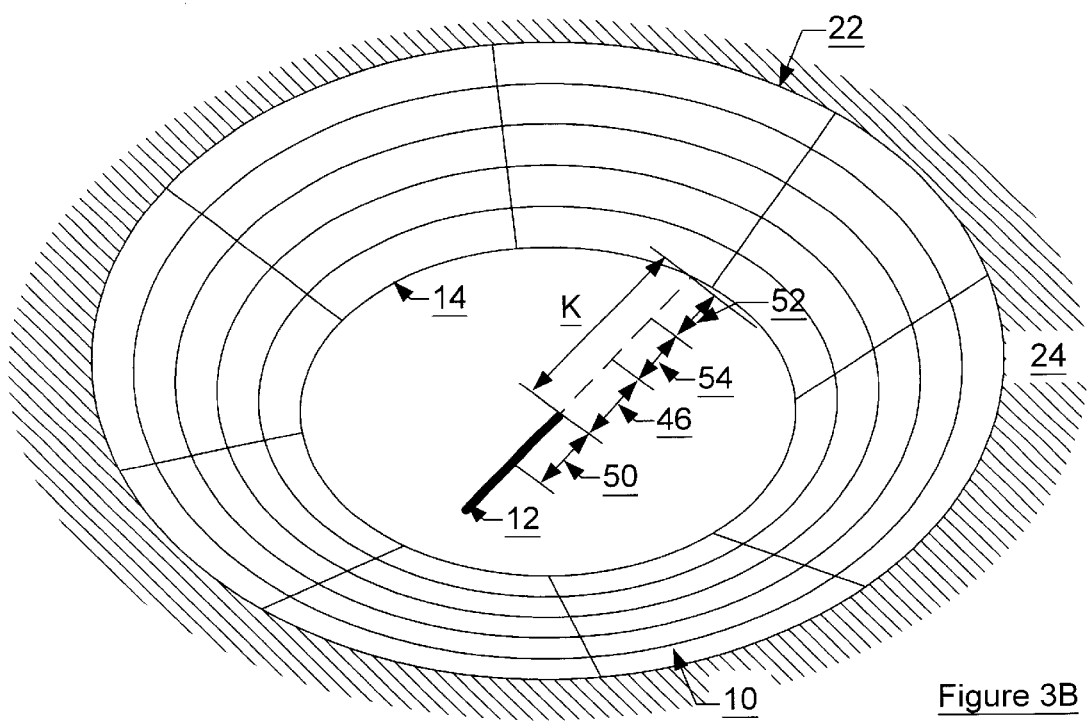
FIG. 3B is a perspective view illustrating graphically a terrain clearance floor envelope generated about a selected runway according to one embodiment of the present invention.

With reference to FIG. 3B, however, the apparatus, methods, and computer program products of the present invention defines the location of the inner boundary of the terrain clearance floor envelope based on errors in the indicated position of the aircraft and in the indicated altitude of the aircraft. Importantly, the apparatus, methods, and computer program products of the present invention modulate the location of the inner boundary based on the particular errors associated with the indicated position of the aircraft and the errors in the indication of the altitude of the aircraft.

Specifically, with reference to FIG. 3B, in one embodiment of the present invention, the apparatus, methods, and computer program products define the inner boundary based on not only the position uncertainty factor 46 and the half-length L of the selected runway 50, but also on a runway position quality factor 52 and an altitude data quality factor 54. For instance, in one embodiment of the present invention, the apparatus, methods, and computer program products sum these values together to determine a calculated position uncertainty K between the inner boundary and selected runway:

$$K = \text{Aircraft.Pos.Uncert.} + \text{Rwy.Pos.Uncert.} + \text{Alt.Pos.Uncert.}$$

In this embodiment, if the aircraft position uncertainty is zero, the processor uses a value of 0.5 nm. Further, in some embodiments, the processor limits the value of the calculated position uncertainty K to:

$$0.5 \text{nm} < K < 1.0 \text{nm}.$$

After the processor determines K, the processor next sums the calculated position uncertainty K with the half-length L of the selected runway to define the inner boundary location.

As the runway position quality factor is dependent on the particular selected runway, the apparatus, methods, and computer program products of the present invention modulate the location of the inner boundary based on the selected runway, as opposed to a preselected buffer distance for all selected runways. Further, the apparatus, methods, and computer program products of the present invention define the location of the inner boundary based on errors in the indicated altitude of the aircraft. By defining the location of the inner boundary of the terrain clearance floor envelope based on determinable errors, as opposed to a preselected buffer distance, the apparatus, methods, and computer program products of the present invention may more precisely define the terrain clearance floor envelope, while not unnecessarily increasing the area in which ground proximity warning alarms are not provided.

Specifically, the conventional ground proximity warning system, using only the aircraft position uncertainty and the preselected buffer distance may define the inner boundary to be at a distance as much as 1.6 nm from the runway, and may be even greater. However, the apparatus, methods, and computer program products, using the added values of runway position uncertainty and altitude uncertainty in place of the preselected buffered distance, typically define the inner boundary at distances in the range of 0.5 nm to 1.0 nm from the runway.

These and other advantages are provided by an apparatus for generating a terrain clearance floor envelope for use in a ground proximity warning system. With regard to the present invention, FIG. 2 illustrates one embodiment of an apparatus of the present invention. The apparatus of this embodiment includes a processor 56 associated with the look-ahead warning generator previously described. The processor may either be part of the processor of the look-ahead warning generator or it may be a separate processor located either internal or external to the look-ahead warning generator. It must be understood that the processor may consist of any number of devices. The processor may be a data processing device, such as a microprocessor or microcontroller or a central processing unit. The processor could be another logic device such as a DMA (Direct Memory Access) processor, an integrated communication processor device, a custom VLSI (Very Large Scale Integration) device, an ASIC (Application Specific Integrated Circuit) device or any other analog or digital circuitry designed to process the various signals as described above.

Figure 4:
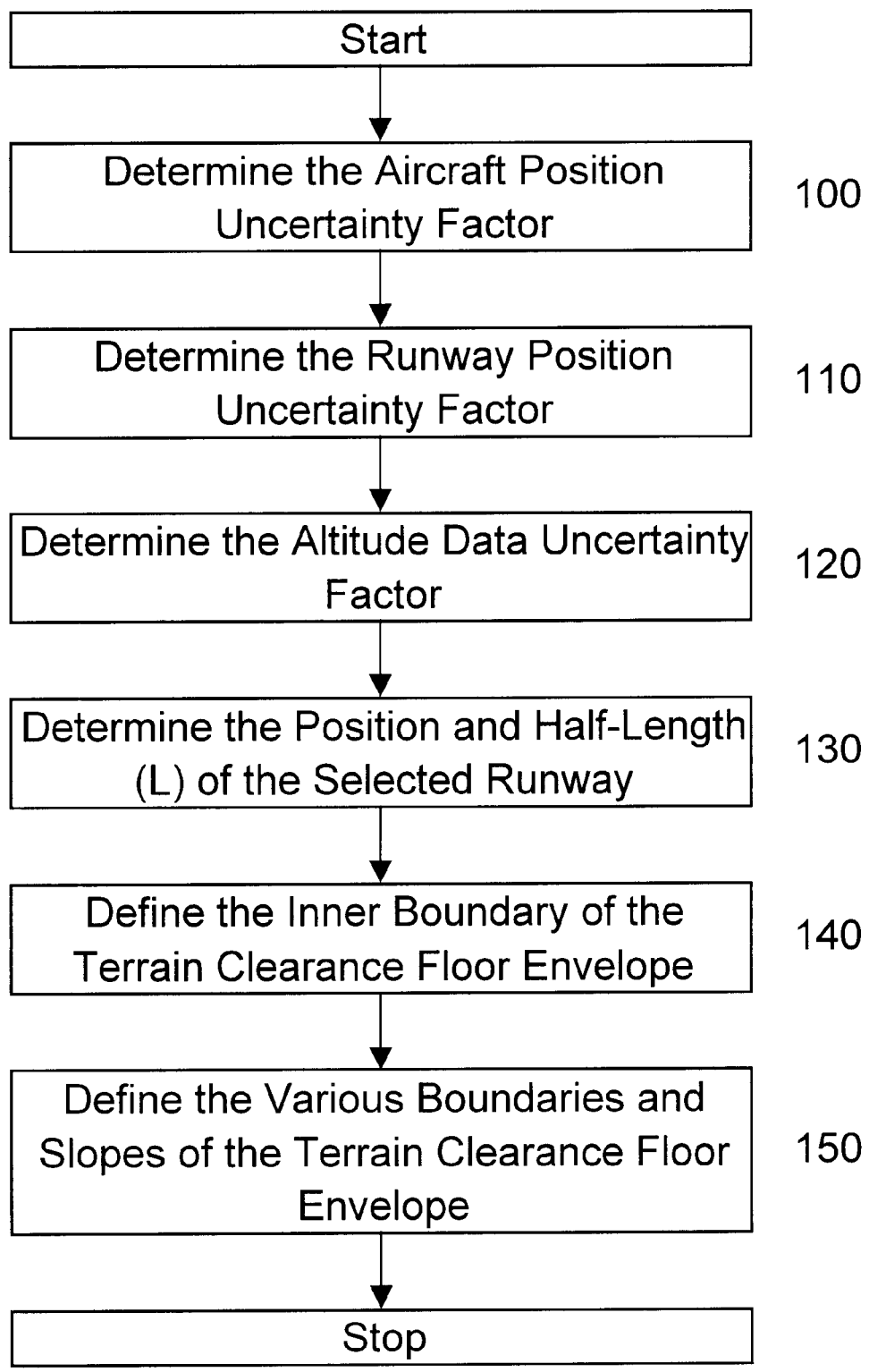
FIG. 4 is a block diagram of the operations performed to define a terrain clearance floor envelope about a selected runway according to one embodiment of the present invention.
Figure 5:
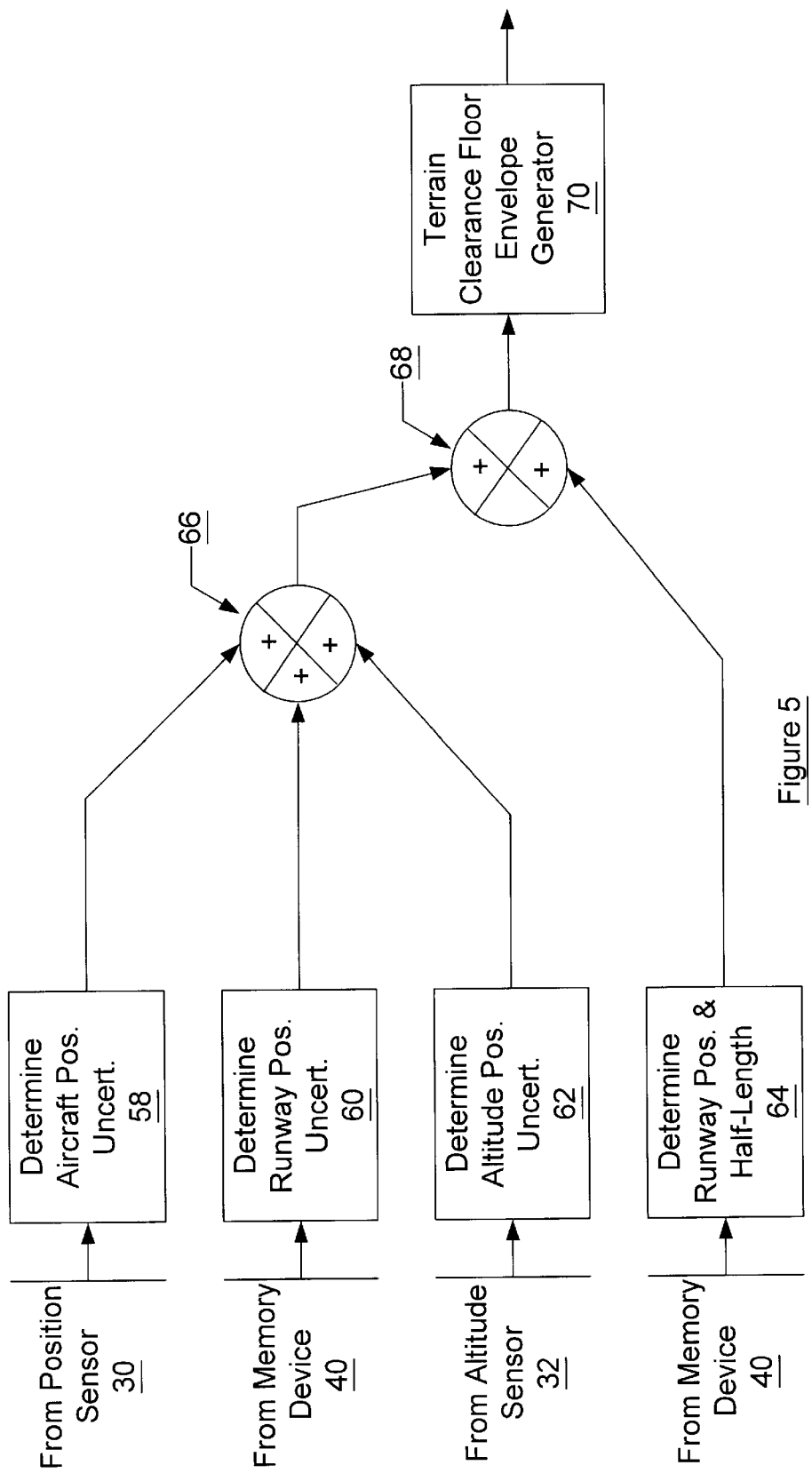
FIG. 5 is also a block diagram of the operations performed to define a terrain clearance floor envelope about a selected runway according to one embodiment of the present invention.

With reference to FIGS. 2, 4, and 5, the generation of the terrain clearance floor envelope is illustrated according to one embodiment. Specifically, FIG. 4 is an operational flow diagram, while FIG. 5 depicts the operations of the present invention in block diagram form. In operation to define the terrain clearance floor envelope, the processor initially determines, (see block 58), the aircraft position uncertainty factor. (See step 100). The aircraft position uncertainty factor is a bias factor that estimates the accuracy of the indicated coordinate position generated by the position sensor 30. This error is dependent on the type of position sensor used, (i.e., GPS, FMS, INS, etc.), and is either typically provided by the position sensor or determinable based on the conditions of the navigation system.

The processor also determines, (see block 60), the runway position quality factor 52. (See step 110). The runway position quality factor is a value representing the uncertainty associated with the indicated coordinate positions listed in the database of the memory device. These uncertainties typically represent uncertainties in the survey method used to survey the position of the runway. Specifically, this factor represents the uncertainty in locating the runway in the WGS-84 coordinate system. For example, runways that were originally surveyed in WGS-84 typically have smaller associated position quality factor values than runways that were surveyed in a local coordinate system and then converted to WGS-84. Those runways having coordinates that were converted to WGS-84 have a runway position quality factor based on the confidence in the accuracy of the conversion.

The runway position quality factor is typically stored in the memory device 40 along with the coordinates of the various runways. In this instance, the processor 56 accesses the table stored in the memory device and retrieves the runway position quality factor. (See step 110).

The processor also determines, (see block 62), an altitude data quality factor 54 representing an uncertainty in the indicated altitude of the aircraft. (See step 120). The altitude data quality factor is typically based on a vertical figure of merit (VFOM). The VFOM is a value representing error in the indicated altitude of the aircraft and is typically output by the altitude sensor 32. Because the VFOM is a vertical error, as opposed to a horizontal value, the processor must typically convert the VFOM to a horizontal offset value.

In one embodiment, the processor translates the VFOM, which is a vertical error value, to a horizontal offset value based on a selected nominal descent glideslope. The selected nominal glideslope value defines a nominal angle at which the aircraft typically lands on the runway. Specifically, aircraft typically land on a runway within a given range of glideslope angles ranging from 3° to 7°. The processor of the present invention transforms the vertical VFOM error value to a horizontal value by determining the horizontal distance required for the aircraft to descend the vertical error distance at the nominal glideslope. This is illustrated in the equation below:

$$\text{Altitude.Pos.Uncert.} = (\text{VFOM}/\tan(\theta))$$

where

Altitude.Pos.Uncert.=Altitude Position Uncertainty

θ=the nominal glideslope

VFOM=Vertical Figure of Merit.

For example, if the nominal glideslope angle is selected as 3°, then approximately every 330 ft of VFOM vertical error corresponds to 1 nm of horizontal altitude position uncertainty. As such, the processor determines the altitude position uncertainty in this embodiment by dividing the VFOM by 330 ft/nm.

In addition to the aircraft position uncertainty, runway position uncertainty, and the altitude position uncertainty, the processor also determines, (See block 64), the position and half-length L of the selected runway. (See step 130).

Specifically, the processor accesses the stored table in the memory device and retrieves the position and length of the selected runway.

After the processor has determined the above-mentioned values, the processor next defines the inner boundary of the terrain clearance floor envelope based on these uncertainty values. (See step 140). Specifically, in one embodiment of the present invention, the processor sums, (see block 66), these uncertainty values using the following equation to generate a calculated position uncertainty K:

$$K = \text{Aircraft.Pos.Uncert.} + \text{Rwy.Pos.Uncert.} + \text{Alt.Pos.Uncert.}$$

or $$K = \text{Aircraft.Pos.Uncert.} + \text{Rwy.Pos.Uncert.} + (\text{VFOM}/330)$$

In this embodiment, if the aircraft position uncertainty is zero, the processor uses a value of 0.5 nm. Further, in some embodiments, the processor limits the value of the calculated position uncertainty K to:

$$0.5 \text{ nm} < K < 1.0 \text{ nm}.$$

After, the processor determines K, the processor next sums the calculated position uncertainty K with the half-length (L) of the selected runway to define the inner boundary distance.

In addition to defining the inner boundary of the terrain clearance floor envelope, the processor of the present invention may also define, (see block 70), the remaining portions of terrain clearance floor envelope. (See step 150). Specifically, in one embodiment of the present invention, the terrain clearance floor envelope is defined by an inner and outer boundary and may also be defined by at least one intermediary boundary. In this embodiment of the present invention, the processor may define these boundaries at selected distances from the selected runway and at selected altitudes to reflect a landing pattern of the aircraft.

Figure 6:
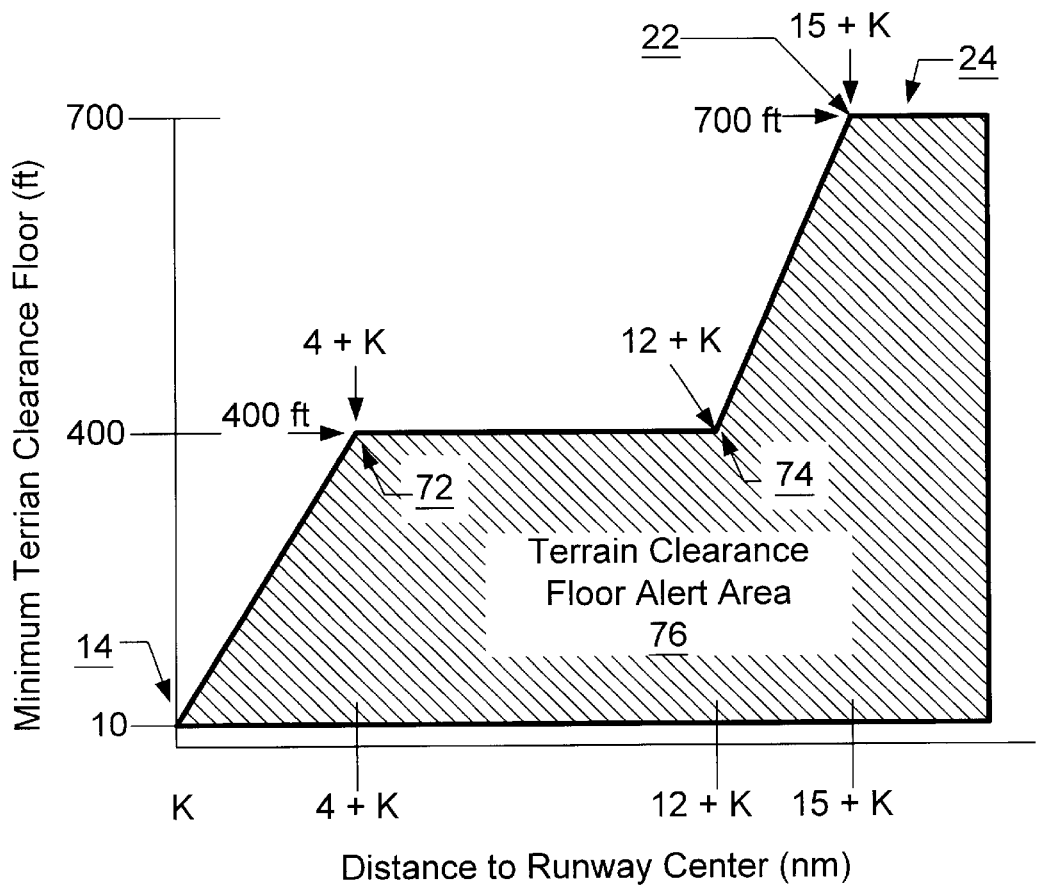
FIG. 6 is a radial, cross-sectional view of the slope profile of a terrain clearance floor envelope according to one embodiment of the present invention.

Specifically, FIG. 6 illustrates graphically an altitude profile for a terrain clearance floor envelope according to one embodiment of the present invention. This terrain clearance floor envelope includes an inner 14 and an outer boundary 22, with two intermediate boundaries, 72 and 74, respectively. As can be seen graphically from FIG. 6, the processor of the present invention defines the location of the outer and intermediate boundaries based on the calculated position uncertainty K at determined distances from the selected runway and at predetermined altitudes, (i.e., (4+K), (12+K), and (15+K). The predetermined altitudes represent minimum altitudes that the aircraft should maintain above terrain underlying the aircraft at the boundary distances from the selected runway.

It must be understood that the altitudes and boundaries illustrated in FIG. 6 are just one example of the different slope profiles that the terrain clearance floor envelope may include. The generation and determination of these slope profiles are more fully discussed in U.S. Pat. No. 4,914,436 to Bateman et al., the contents of which are hereby incorporated by reference.

The terrain clearance floor envelope generated by the processor of the present invention defines a terrain clearance floor alert area 76 about the selected runway. This terrain clearance floor alert area is a region in which the ground proximity warning system will generate alarms. Specifically, if the aircraft enters the terrain clearance floor alert area, (i.e., dips below the minimum altitude that the aircraft should maintain above underlying terrain), for more than a predescribed time, (e.g., 0.8 or 1.0 seconds), the ground proximity warning system will sound an alert to the flight crew.

As detailed above, the apparatus, methods, and computer program products of the present invention use aircraft position uncertainty, runway position uncertainty, and altitude position uncertainty to define the terrain clearance floor envelope. The values used for these uncertainties depends on the particular type of sensor used for navigation and on the survey quality associated with the runway. Below is a listing of different types of sensors and runway surveys and typical associated values used by the apparatus, methods, and computer program products of one embodiment of the present invention.

Aircraft Position Uncertainty
  GPS Direct:
    Aircraft Pos. Uncert.=GPS Horizontal Figure of Merit (HFOM)
  FMS with NavMode word (non Airbus):
  GPS: Aircraft Pos. Uncert.=0.13 nm
  DME/DME, LOC/DME: Aircraft Pos. Uncert.=0.3 nm
  VOR/DME: Aircraft Pos. Uncert.=0.5 nm
  IRS Only, Dr, No Nav: Aircraft Pos. Uncert.=6.0 nm
  FMS with NavMode word (Airbus only):
  Hi Accuracy: Aircraft Pos. Uncert.=0.13 nm
  Lo Accuracy: Aircraft Pos. Uncert.=6.0 nm
  FMS with no NavMode word:
    Aircraft Pos. Uncert.=0.6 nm
Runway Position Uncertainty
  Runway Coordinate System: WGS-84:
  Rwy. Pos. Uncert.=0.3 nm
  Runway Coordinate System: non WGS-84 (local):
  Rwy. Pos. Uncert.=0.5 nm
  Runway Coordinate System: Unknown:
  Rwy. Pos. Uncert.=0.9375 nm In addition to defining the inner boundary of the terrain clearance floor envelope more precisely, the present invention also provides apparatus, methods, and computer program products for defining the terrain clearance floor envelope to be asymmetrical, such that respective profiles of the envelope in a radial cross-section are different for different portions of the terrain clearance floor envelope. Importantly, the apparatus, methods, and computer program products of this embodiment of the present invention provide different slope profiles for different portions of the terrain clearance floor envelope to provide different ground proximity warning protection for aircraft approaching the side of a runway, as opposed to the end of the selected runway.

FIGS. 7A–7D provide an illustrative embodiment of an asymmetrical terrain clearance floor envelope defined by one embodiment of the present invention. It must be understood that this is only one example of an asymmetrical terrain clearance floor envelope and that the apparatus, methods, and computer program products may be used to define a wide variety of asymmetrical envelopes. The terrain clearance floor envelope described below is provided in detail merely to provide a more complete understanding of the invention. As such, the exact measurements, distances, and altitudes illustrated should not limit the scope of the invention.

Figure 7A:
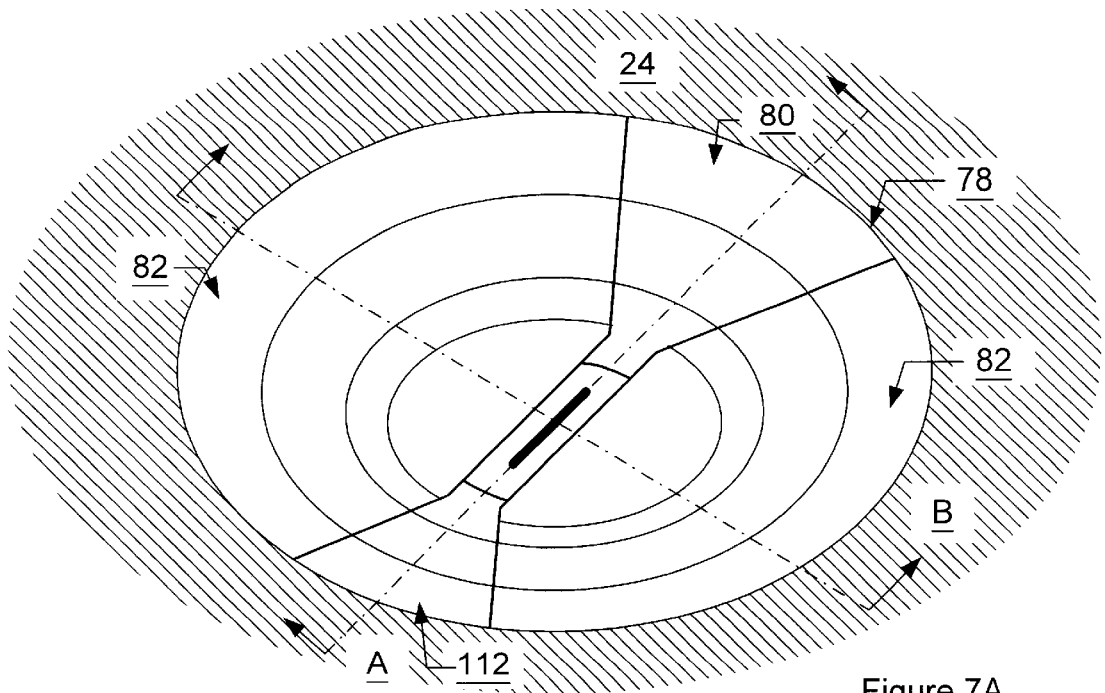
FIG. 7A is a perspective view illustrating graphically a terrain clearance floor envelope generated about a selected runway according to one embodiment of the present invention.
Figure 7B:
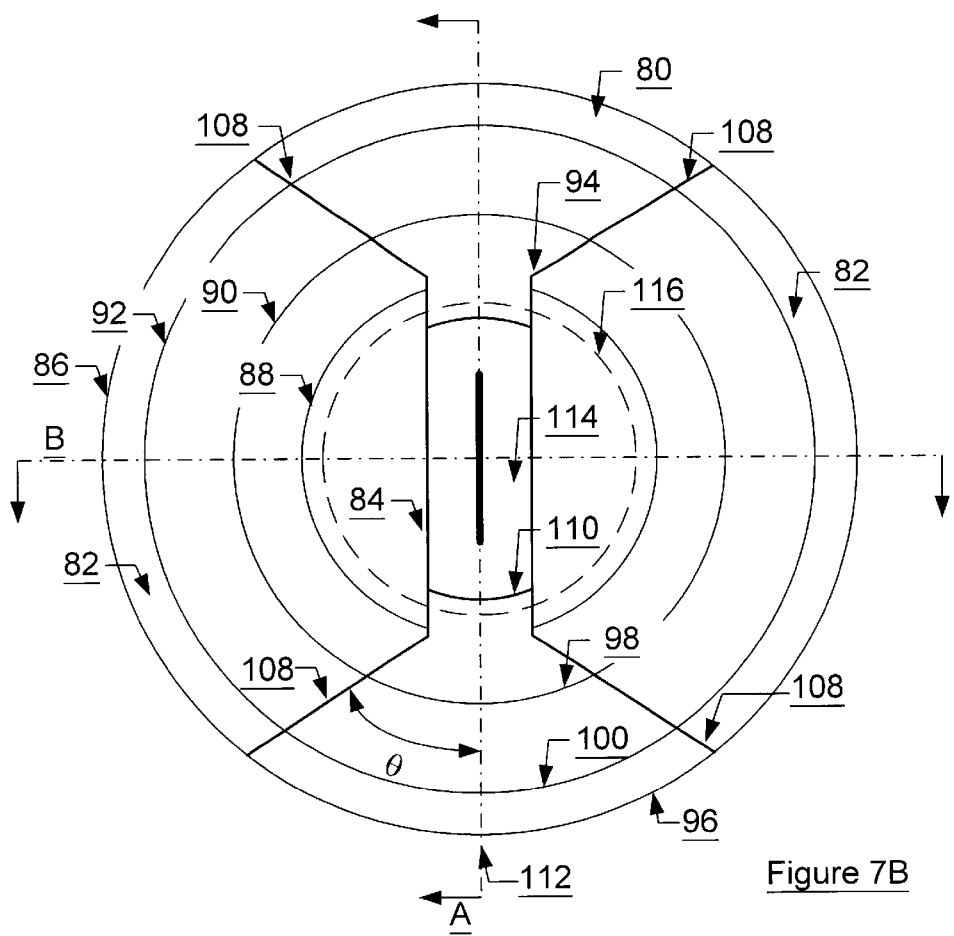
FIG. 7B is a plan view illustrating graphically a terrain clearance floor envelope generated about a selected runway according to one embodiment of the present invention.

FIGS. 7A and 7B provide a three-dimensional perspective and plan view, respectively, of an asymmetrical terrain clearance floor envelope generated by the apparatus, methods, and computer program products according to one embodiment of the present invention. Additionally, FIGS. 7C and 7D depict differing cross-sectional slope profiles of the terrain clearance floor envelope along cross-section lines A and B, respectively.

With reference to FIGS. 7A and 7B, it can be seen that the terrain clearance floor envelope 78 of this embodiment includes both end regions 80 adjacent to the ends of the selected runway 12 and side regions 82 adjacent to the sides 82 of the selected runway 12. The side regions of the terrain clearance envelope are defined by an inner boundary 84, an outer boundary 86, and three intermediate boundaries, 88, 90, and 92. The end regions are defined by an inner boundary 94, an outer boundary 96, and two intermediate boundaries, 98 and 100. Further, the inner boundaries, 84 20 and 94, of the side and end regions form a perimeter about the selected runway. In the region between the selected runway 12 and the perimeter defined by the inner boundaries, 84 and 94, the ground proximity warning system ceases generation of ground proximity warning alerts to eliminate nuisance alarms during the final approach of the aircraft for landing.

Figure 7C:
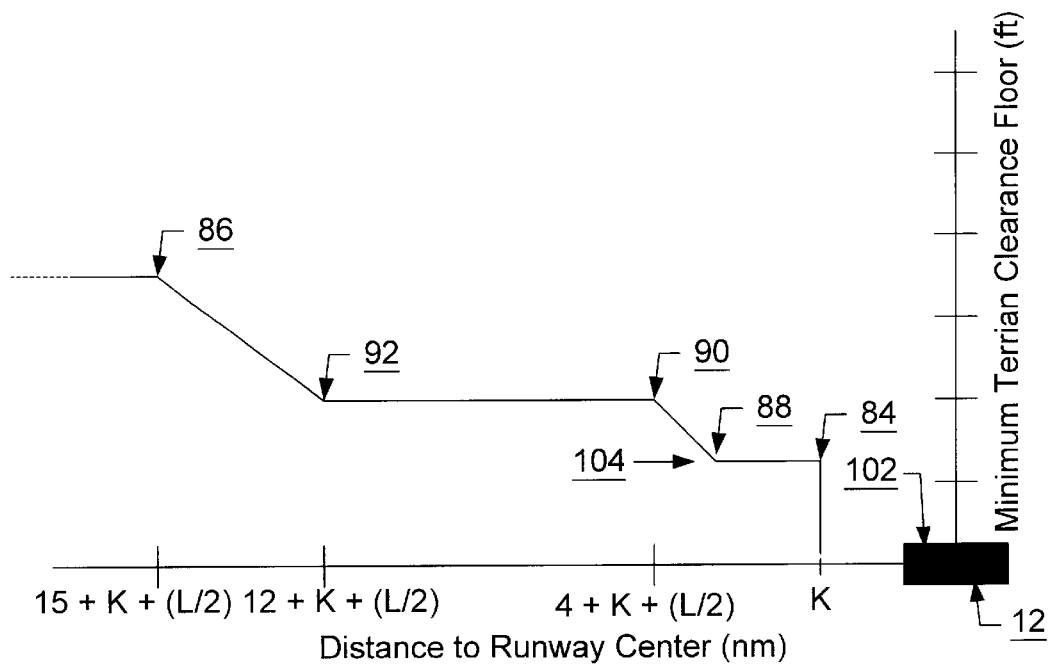
FIGS. 7C and 7E are radial, cross-sectional views of the slope profile of a side region of a terrain clearance floor envelope adjacent to the sides of a selected runway according to one embodiment of the present invention.
Figure 7D:
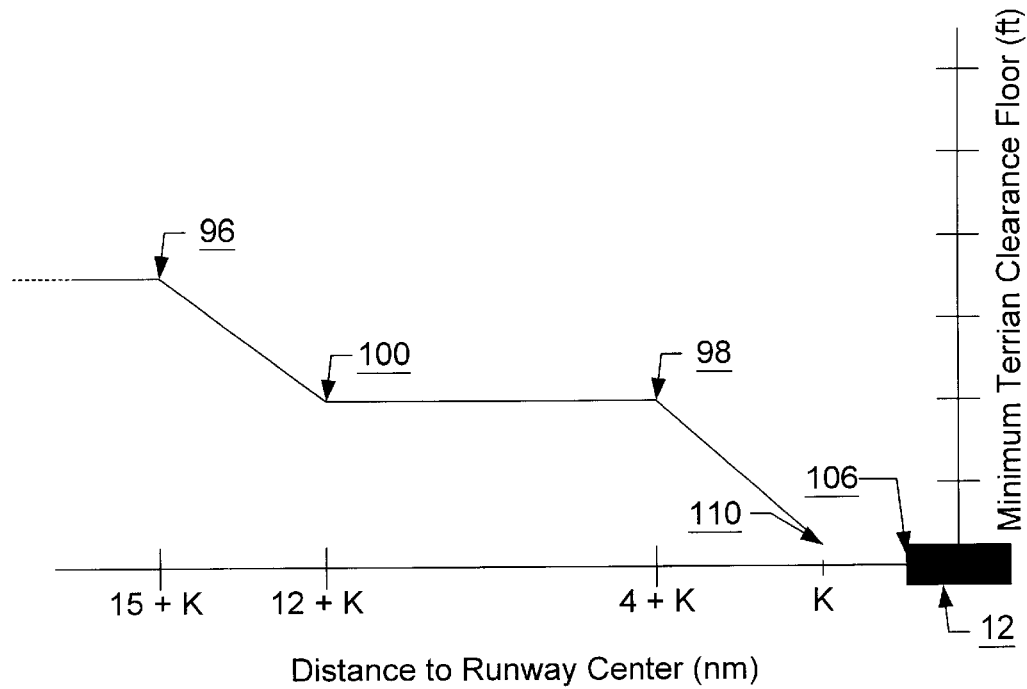
FIGS. 7D and 7F are radial, cross-sectional views of the slope profile of an end region of a terrain clearance floor envelope adjacent to the ends of a selected runway according to one embodiment of the present invention.

With reference to FIGS. 7C and 7D, the cross-sectional profiles of the end and side regions are shown. Importantly, the end and side regions of the terrain clearance floor envelope are defined independent of each other. As such, the end portions of the envelope may be defined to represent a landing pattern of an aircraft on the selected runway, while the side portions may be defined for aircraft that approach a side of the selected runway.

Specifically, with reference to FIG. 7C, the cross-sectional profile of a side region 82 of the terrain clearance floor envelope is illustrated along cross-section line B. As can be seen, the location of the various boundaries of the terrain clearance floor envelope are based on the calculated position uncertainty K discussed previously. Specifically, with reference to FIGS. 2, 4, and 5, the processor of the present invention initially determines the calculated position uncertainty K, (see steps 100–130), using the following equation:

$$K = \text{Aircraft.Pos.Uncert.} + \text{Rwy.Pos.Uncert.} + \text{Alt.Pos.Uncert.}$$

or $$K = \text{Aircraft.Pos.Uncert.} + \text{Rwy.Pos.Uncert.} + (\text{VFOM}/330)$$

In this embodiment, if the aircraft position uncertainty is zero, the processor uses a value of 0.5 nm. Further, in some embodiments, the processor limits the value of the calculated position uncertainty K to:

$$0.5 \text{ nm} < K < 1.0 \text{ nm}.$$

After, the processor determines the calculated position uncertainty K, the processor next defines the inner boundary 84 of the side portion 82 of the terrain clearance floor envelope. (See step 140). In this embodiment, the inner boundary 84 is defined at a location of the calculated position uncertainty K from the side 102 of the selected runway 12. The processor also defines the intermediate boundaries 90 and 92 and the outer boundary 86 based on respective selected distances, the calculated position uncertainty K, and the half-length L of the selected runway (i.e., (4+K+L/2), (12+K+L/2), and (15+K+L/2). (See step 150).

In addition to defining the distance of the differing boundaries from the selected runway, the processor also defines the differing boundaries at different selected altitudes. The selected altitudes used to define the intermediate and outer boundaries of the terrain clearance floor envelope are selected to represent a terrain clearance floor envelope for aircraft approaching from the side of the selected runway, as opposed to the end of the selected runway. These altitudes represent minimum acceptable altitudes that an aircraft should maintain above underlying terrain for aircraft approaching the side of the selected runway. Importantly, the processor defines the inner boundary 84 at a preselected altitude 104. The preselected altitude extends from the inner boundary 84 to an intermediate boundary 88, where the preselected altitude intersects with a sloped portion of the terrain clearance floor envelope. It must be understood that the preselected altitude 104 of the side regions of the selected runway may be any desired altitude. The altitude is typically in the range of 200 ft to 300 ft and is typically 245 ft.

Importantly, the preselected altitude defines a minimum altitude of the side portions of the terrain clearance floor envelope. This is a selected altitude representing a minimum altitude that an aircraft should maintain above terrain underlying the aircraft as it approaches the selected runway from the side. It is important to provide added protection for aircraft that approach from the side of a selected runway. As discussed previously, the selected runway may be selected by any number of methods. In one embodiment, the selected runway is selected as the runway closest to the current position of the aircraft. In this instance, the aircraft may not approach the end of the runway, but instead, may be approaching from the side of the selected runway. In this instance, it may be advantageous to increase the region in which ground proximity warning protection is provided on the sides of the selected runway. Further, it may be advantageous to provide an increased minimum altitude 104 near the inner boundary.

In other embodiment, the selected runway may be selected using the runway prediction method detailed in U.S. patent application Ser. No. ??/???,??? to Ishihara and Gremmert, which was mentioned previously. When this prediction method is used, the method typically selects a runway that the aircraft is approaching from the end. However, in instances in which the airport only has one runway, the prediction method will most likely select this lone runway as the selected runway, even though the aircraft may be approaching from the side of the selected runway.

In addition to providing added protection for aircraft that approach from a side of the selected runway, the apparatus, methods, and computer program products also provide protection for an aircraft that may be misaligned with the selected runway when landing. Specifically, the preselected altitude 104 of the inner boundary 84 of the side regions 82 of the terrain clearance floor envelope is typically greater than the altitude for the inner boundary 110 of the end regions 80 of the terrain clearance floor envelope. If an aircraft approaching the end of the selected runway for landing is too far to the right or left of the lengthwise extending axis 112 and below the preselected altitude 104, the aircraft will pierce the side region 82 of the envelope. In this instance, the ground proximity warning system will provide a ground proximity alert indicating that the aircraft is not properly aligned with the selected runway.

As discussed, the processor of the present invention defines the end regions 80 of the terrain clearance floor envelope to reflect a landing pattern for an aircraft approaching the end of the selected runway. With reference to FIG. 7D, the cross-sectional profile of a side region 80 of the terrain clearance floor envelope is illustrated along cross-section line A. As can be seen, the location of the various boundaries of the terrain clearance floor envelope are based on the calculated position uncertainty K discussed previously.

Specifically, after the processor determines the calculated position uncertainty K, the processor defines the inner boundary 94 of the side portion 80 of the terrain clearance floor envelope. (See step 140). In this embodiment, the inner boundary 94 is defined at a location that is equal to the calculated position uncertainty K from the end 106 of the selected runway 12. The processor also defines the intermediate boundaries 98 and 100 and the outer boundary 96 based on respective selected distances and the calculated position uncertainty K from the end of the selected runway (i.e., (4+K), (12+K), and (15+K)).

The processor also defines the differing boundaries at different selected altitudes. These selected altitudes of the inner, intermediate, and outer boundaries of the terrain clearance floor envelope are chosen to reflect a terrain clearance floor envelope for aircraft approaching the ends of the selected runway. Importantly, the processor defines the distances and altitudes of the boundaries of the end portions of the terrain clearance envelope to reflect a landing pattern of the aircraft.

In addition to defining the location and altitude of the various boundaries of the end and side regions of the terrain clearance floor envelope, the processor also defines the end region of the terrain clearance floor envelope to represent various landing patterns of aircraft. Specifically with reference to FIG. 7B, the inner boundaries, 84 and 94, of the terrain clearance floor envelope may be defined to provide a proper landing profile for an aircraft, while at the same time providing protection for aircraft approaching a side of the selected runway.

For instance, in one embodiment, the inner boundaries form "dumb bell" or "dog bone" shaped end regions 80 for the terrain clearance floor envelopes. The inner boundary 84 of the side regions of the terrain clearance floor envelope are parallel lines that are spaced apart from the sides of the runway by K. (See FIG. 7C). Further, first portions 108 of the inner boundary 94 of the end region 80 define a radius centered about the selected runway having a length of K+L/2. (See FIG. 7D). Additionally, the inner boundary 94 also includes second portions 110 that converge from the outer boundary 96 to the inner boundary 84 of the side regions 82. These second portions typically converge at a selected angle θ from a lengthwise extending center axis 112 of the selected runway.

Importantly, the inner boundaries, 84 and 94, define a desired landing approach of an aircraft. Specifically, the angle θ at which the second portions 110 converge is selected to represent a variety of possible horizontal bearing angles that an aircraft may make with the runway when landing. For example, a typical value for θ is 45°. This means that aircraft having a bearing angle that is less than 45° with respect to the lengthwise extending axis of the selected runway, are located in the end regions of the terrain clearance floor envelope. If the bearing angle is greater than 45° with respect to the lengthwise extending axis of the selected runway, the aircraft is presumed to not be landing and is located in the side regions of the terrain clearance floor envelope.

In addition to the converging lines, the parallel lines of the inner boundary 84 of the side regions 82 define an area nearer the end of the selected runway, in which the aircraft is typically more aligned with the lengthwise extending axis 112 of the selected runway on its final landing approach. This inner boundary 84 allows an aircraft that is properly aligned with the runway to land without generation of ground proximity warning alarms. However, if the aircraft is approaching the sides of the runway or is misaligned by more than θ with the lengthwise extending axis of the selected runway, the ground proximity warning system will generate alarms if the aircraft pierces the side regions of the terrain clearance floor envelope.

FIG. 7B also illustrates graphically the region 114 between the inner boundary of the terrain clearance floor envelope and the selected runway in which the ground proximity warning system does not provide ground proximity warning alerts. FIG. 7B also depicts by dashed line a typical inner boundary 116 for a terrain clearance floor envelope defined by the conventional ground proximity warning system. As can be seen, the conventional ground proximity warning system defines a circular inner boundary 116 that is typically located further from the selected runway than the inner boundary defined by the apparatus, methods, and computer program products of the present invention. Further, because the inner boundary 116 is circular, the portions of the inner boundary 116 adjacent to the sides of the selected runway are at a further distance than portions of the inner boundary 116 adjacent to the ends of the selected runway.

On the other hand, the inner boundary, 84 and 110, defined by the present invention is modulated to account for runway position uncertainty and altitude position uncertainty and therefore, may be defined closer to the selected runway. Further, the inner boundary of the present invention has portions adjacent to the sides of the selected runway that are defined differently than the end portions to provide different ground proximity warning protection for the sides of the selected runway than for the ends of the selected runway.

Figure 8A:
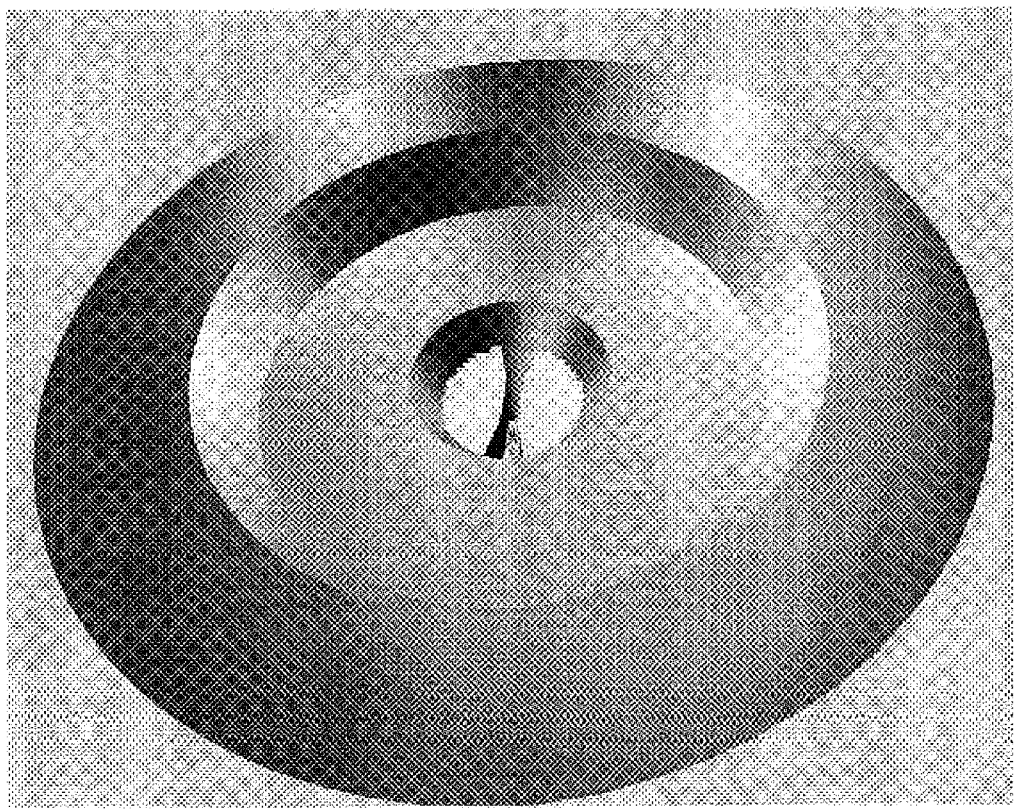
FIGS. 8A–8C are perspective views illustrating graphically a terrain clearance floor envelope generated about a selected runway according to one embodiment of the present invention.
Figure 8B:
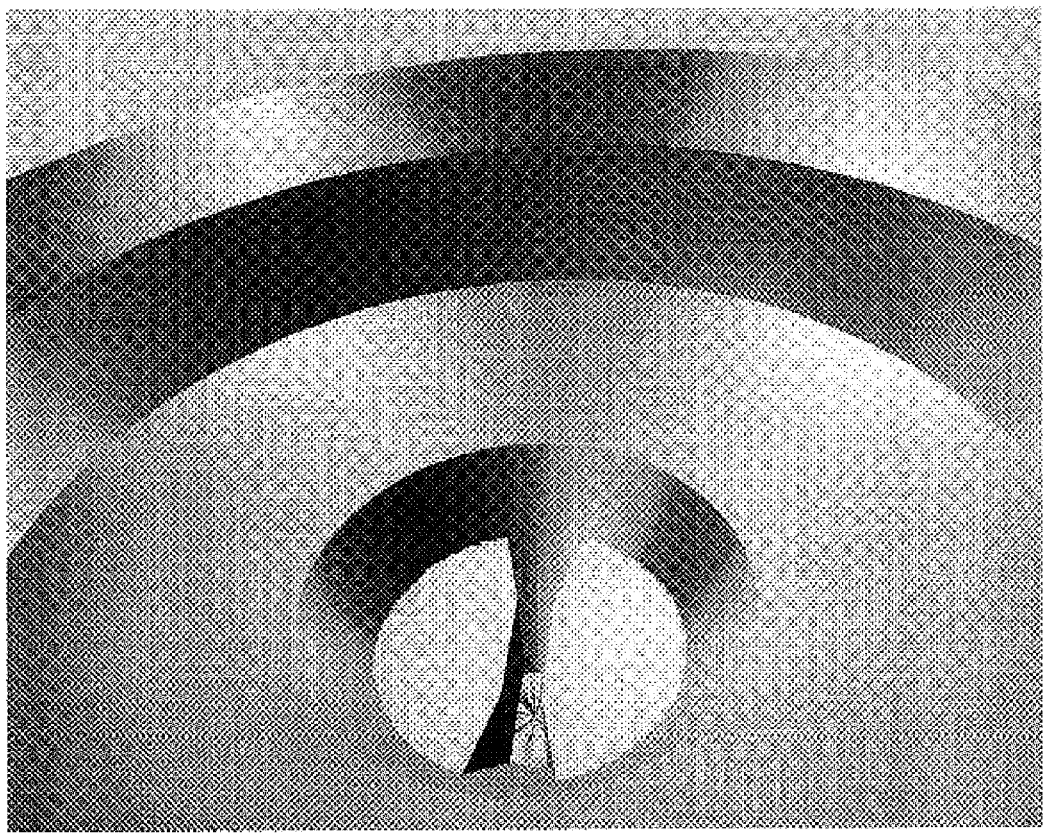
Figure 8C:
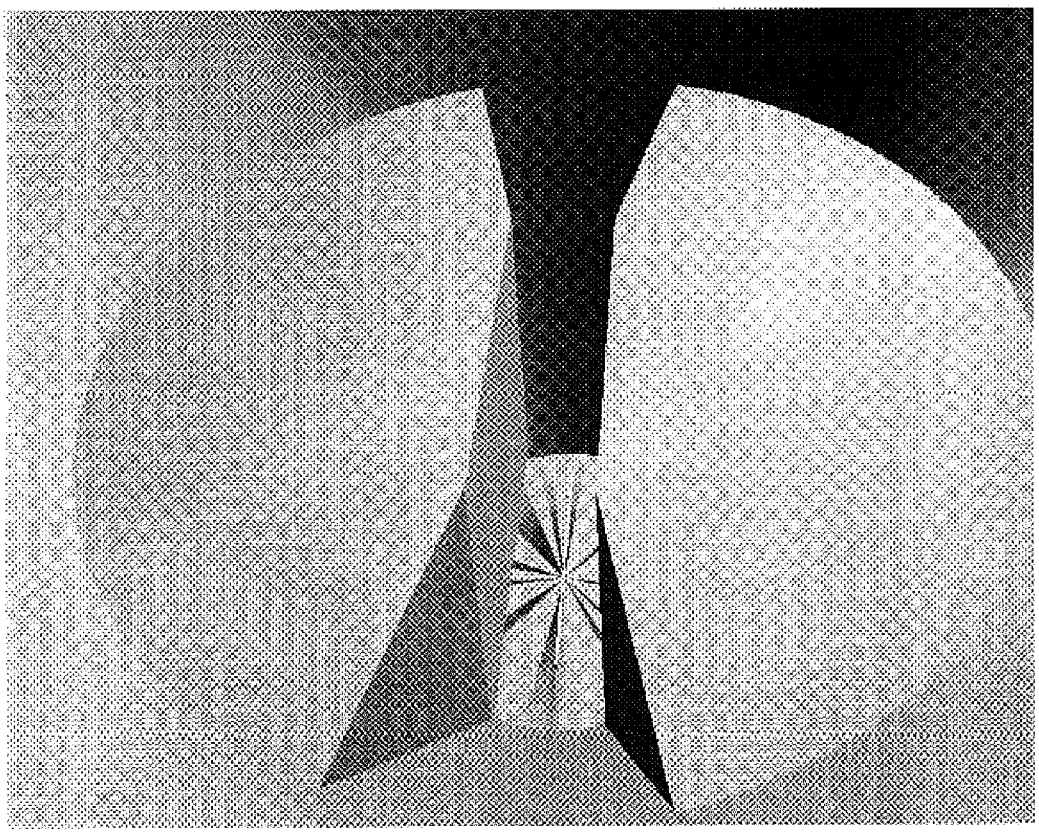

As detailed above, the apparatus, methods, and computer program products of the present invention define a terrain clearance floor envelope having different side and end regions to provide different ground proximity warning protection for the sides and ends of a selected runway. To provide a more complete description of the present invention, FIGS. 8A–8C are three-dimensional illustrations of the terrain clearance floor envelope defined according to one embodiment of the present invention. With reference to these figures, FIGS. 8A–8C illustrate the appearance of the terrain clearance floor envelope as an aircraft approaches the selected runway. These figures illustrate the various boundaries of the terrain clearance floor envelope. Importantly, they illustrate graphically the "dumb bell" or "dog bone" shaped end regions 80 of the terrain clearance floor envelope.

Figure 7E:
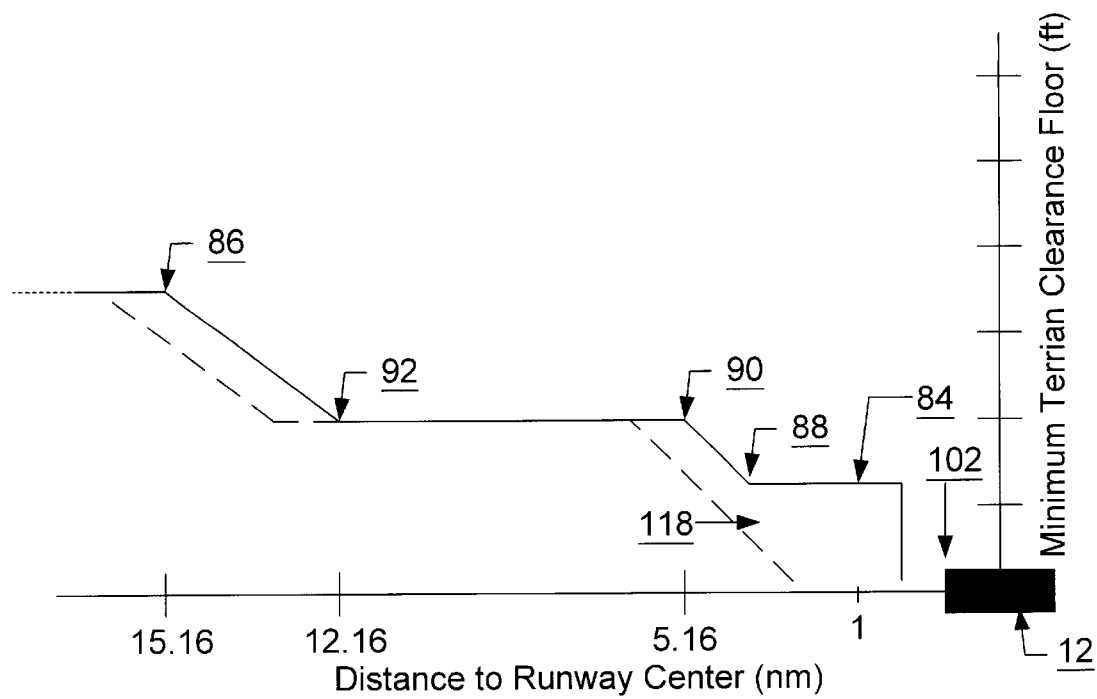
Figure 7F:
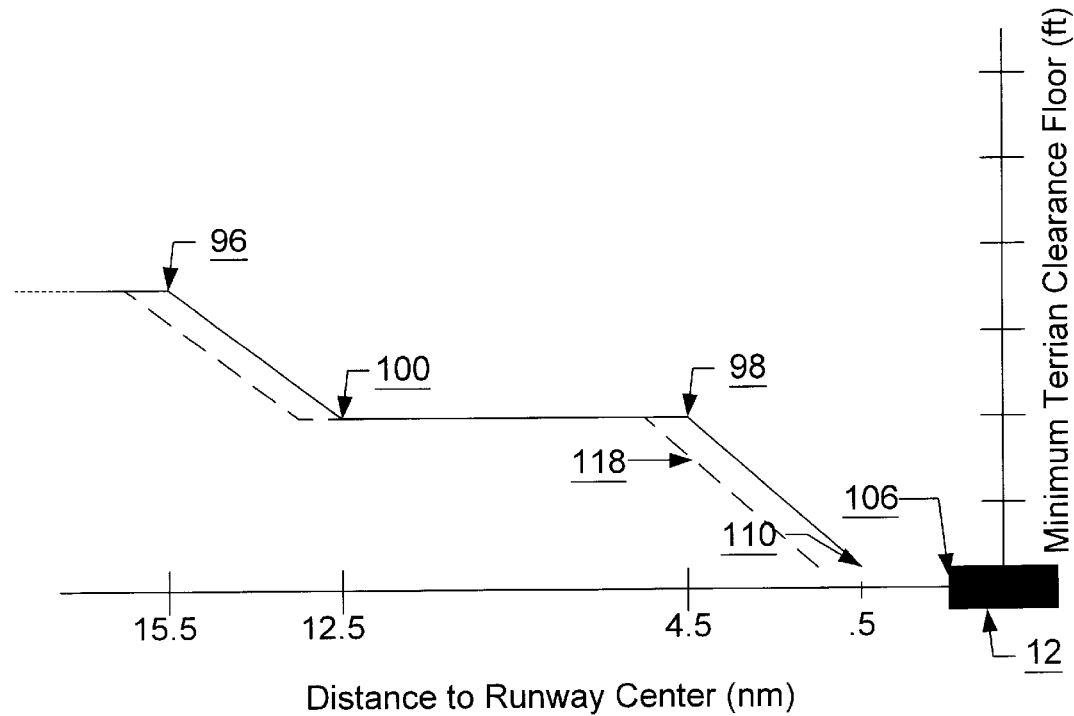

In addition to FIGS. 8A–8C, FIGS. 7B, 7E, and 7F are provided to illustrate one example of a terrain clearance floor envelope defined by the present invention. Specifically, FIGS. 7B, 7E, and 7F illustrate graphically a terrain clearance floor envelope defined according to one embodiment of the present invention based on the following given parameters:

Aircraft Pos. Uncert.:
GPS Direct=0.05 nm
Rwy. Pos. Uncert.:
Runway Coordinate WGS-84 32 0.3 nm
Altitude Pos. Uncert.:
VFOM=45 ft
Runway Length:
L=8000 ft With reference to FIGS. 2, 4, and 5, in this embodiment, the processor initially receives the above values and determines, (see steps 100–130), a calculated position uncertainty factor K using the following equation:

$$K = \text{Aircraft.Pos.Uncert.} + \text{Rwy.Pos.Uncert.} + \text{Alt.Pos.Uncert.}$$

or $$K = \text{Aircraft.Pos.Uncert.} + \text{Rwy.Pos.Uncert.} + (\text{VFOM}/330)$$

In this embodiment, if the aircraft position uncertainty is zero, the processor uses a value of 0.5 nm. Further, in some embodiments, the processor limits the value of the calculated position uncertainty K to:

$$0.5 \text{ nm} < K < 1.0 \text{ nm}.$$

Given the above values, the processor determines the calculated position uncertainty as:

$$K = 0.05 + 0.3 + (45/330)$$

or $$K = 0.49 \text{ nm}$$

As K in this example is less than 0.5 nm, the processor determines the calculated position uncertainty K=0.5 nm.

With reference to FIGS. 7E and 7F, the processor uses the calculated position uncertainty K to define the end and side portions of the terrain clearance floor envelope. Specifically with reference to FIG. 7E, the processor defines the inner 84, outer 86, and intermediate boundaries, 88–92, as follows:

$$\text{Inner Boundary } 84 = K = 0.5 \text{ nm}$$

$$\text{Outer Boundary } 86 = (15 + K + L/2)$$

$$= 15 + 0.5 + ((4000 \text{ ft})(1 \text{ nm}/6076.11 \text{ ft}))$$

$$= 16.16 \text{ nm}$$

$$\text{Inter. Boundary } 90 = (4 + K + L/2)$$

$$= 5.16$$

$$\text{Inter. Boundary } 92 = (12 + K + L/2)$$

$$= 12.16$$

In this embodiment, the preselected altitude 104 for the inner boundary 84 of the side regions 82 is 245 ft. This constant altitude slope intersects the remaining portions of the terrain clearance floor envelope at boundary 88, which is approximately 3.66 nm. Further, the inner boundary 84 defines lines that are parallel to lengthwise axis 112 of the selected runway and spaced apart from the selected runway by K. The remaining boundaries, 86, 90, and 92, are arcs having radii as defined above with respect to the center point of the selected runway.

With reference to FIG. 7F, the processor uses the calculated position uncertainty K to define the end portions of the terrain clearance floor envelope. Specifically, the processor defines the inner 110, outer 96, and intermediate boundaries, 98 and 100, as follows:

$$\text{Inner Boundary } 110 = K = 0.5 \text{ nm}$$

$$\text{Outer Boundary } 96 = (15 + K)$$

$$= 15 + 0.5 = 15.5 \text{ nm}$$

$$\text{Inter. Boundary } 98 = (4 + K) = 4.5 \text{ nm}$$

$$\text{Inter. Boundary } 100 = (12 + K) = 12.5 \text{ nm}$$

Further, the processor defines the first portions 108 of the inner boundary of the end regions 82 as converging lines converging at an angle of θ=45° with the lengthwise extending axis 112 of the selected runway. Further, the boundaries, 96, 98, 100, and 110, are arcs having radii as defined above with respect to the end of the selected runway.

In contrast to the terrain clearance floor envelope generated by the apparatus, methods, and computer program products of the present invention, FIGS. 7B, 7E, and 7F also illustrate the terrain clearance floor envelope as it would be defined by the conventional ground proximity warning system based in the given parameters. This terrain clearance floor envelope is illustrated by dashed lines. Specifically, FIG. 7B illustrates only the inner boundary 116 of the conventional terrain clearance floor envelope, while FIGS. 7E and 7F represent the slope profile 118.

Based on the above parameters, the conventional ground proximity warning system defines the end regions of the terrain clearance floor envelope as follows:

$$K = \text{Aircraft.Pos.Uncert.} + \text{Preselected Buffer Dist.}$$

$$K = 0.05 \text{ nm} + 1 \text{ nm}$$

$$= 1.05 \text{ nm}$$

$$\text{Inner Boundary} = K = 1.05 \text{ nm}$$

$$\text{Outer Boundary} = (15 + K)$$

$$= 15 + 1.05 = 16.05 \text{ nm}$$

$$\text{Inter. Boundary} = (4 + K) = 5.05 \text{ nm}$$

$$\text{Inter. Boundary} = (12 + K) = 13.05 \text{ nm}$$

and the side regions of the terrain clearance floor envelope as follows:

$$K = \text{Aircraft.Pos.Uncert} + \text{Preselected Buffer Dist.}$$

$$K = 0.05 \text{ nm} + 1 \text{ nm}$$

$$= 1.05 \text{ nm}$$

$$\text{Inner Boundary} = K + L/2$$

$$= (4000 \text{ ft})(1 \text{ nm}/6076.11 \text{ ft}) + 1.05 \text{ nm}$$

$$= 1.71$$

$$\text{Outer Boundary} = (15 + K + L/2)$$

$$= 15 + 1.71 = 16.71 \text{ nm}$$

$$\text{Inter. Boundary} = (4 + K + L/2) = 5.71 \text{ nm}$$

$$\text{Inter. Boundary} = (12 + K + L/2) = 13.71 \text{ nm}$$

As can be seen from the comparison of the respective envelopes generated by the present invention and the conventional ground proximity warning system, the apparatus, methods, and computer program products of the present invention provide a more precise determination of the location of the terrain clearance floor envelope. Further, the processor, methods, and computer program products do not unnecessarily increase the region between the envelope and selected runway where the ground proximity warning system ceases generating alerts.

In addition to providing apparatus and methods, the present invention also provides computer program products for generating a terrain clearance floor envelope about a selected runway for use in a ground proximity warning system. The computer program products have a computer readable storage medium having computer readable program code means embodied in the medium. With reference to FIG. 2, the computer readable storage medium may be part of the memory device 40, and the processor 46 of the present invention may implement the computer readable program code means to define a terrain clearance floor envelope as described in the various embodiments above.

The computer-readable program code means includes first computer instruction means for defining the terrain clearance floor envelope dependent upon at least two boundaries. Specifically, first computer instruction means defines at least one of the boundaries based on at least one of a runway position quality factor representing an uncertainty factor in the location of the runway and an altitude data quality factor representing an uncertainty factor in the altitude of the aircraft. In one embodiment, of the present invention, the first computer instruction means defines a boundary of the terrain clearance floor envelope by summing the runway position quality factor, altitude data quality factor, and the aircraft position quality factor.

In some embodiment, the computer-readable program code means may further include second computer instruction means for generating the altitude data quality factor by dividing the uncertainty in the altitude of the aircraft by the tangent of the predetermined glideslope angle. The computer-readable program code means may further include third computer instruction means for accessing a stored database containing runway position quality factors for a plurality of candidate runways, such that the first computer instruction means defines at least one of the boundaries based on the runway position quality factor associated with the selected runway.

In another embodiment, the computer-readable program code means includes first computer instruction means for defining the terrain clearance floor envelope to be asymmetrical such that respective profiles of the envelope in a radial cross-section are different in at least two radial directions from a center point of the selected runway. Depending on the embodiment, the first computer instruction means may define end and side regions of the terrain clearance floor envelope differently to reflect different landing and flight patterns as described above in relation to the various apparatus and methods of the present invention.

In this regard, FIGS. 2, 4, and 5 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s). Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for generating a terrain clearance floor envelope for use in a ground proximity warning system that provides ground proximity alerts to an aircraft, wherein said apparatus comprises a processor that generates a terrain clearance floor envelope about a selected runway, wherein said processor defines the terrain clearance floor envelope dependent upon at least two boundaries, and wherein said processor defines at least one of the boundaries based on at least one of a runway position quality factor representing an uncertainty factor in the location of the selected runway and an altitude data quality factor representing an uncertainty factor in the altitude of the aircraft.

2. An apparatus according to claim 1, wherein said processor defines at least one of the boundaries of the terrain clearance floor envelope based on both the runway position quality factor and the altitude data quality factor.

3. An apparatus according to claim 2, wherein said processor defines at least one of the boundaries of the terrain clearance floor envelope by summing the runway quality factor and the altitude data quality factor.

4. An apparatus according to claim 1, wherein said processor defines at least one of the boundaries of the terrain clearance floor envelope based on an aircraft position uncertainty factor representing an uncertainty in the position of the aircraft and at least one of a runway position quality factor and an altitude data quality factor.

5. An apparatus according to claim 1, wherein the altitude data quality factor is a horizontal distance representing an uncertainty in the altitude of the aircraft converted to a horizontal error factor, and wherein said processor generates the altitude data quality factor by dividing the uncertainty in the altitude of the aircraft by the tangent of the predetermined glideslope angle.

6. An apparatus according to claim 1 further comprising a memory device in electrical communication with said processor, wherein said memory device includes a database containing runway position quality factors for a plurality of candidate runways, and wherein said processor accesses the database and retrieves a runway position quality factor associated with the selected runway for generating the terrain clearance floor envelope.

7. An apparatus according to claim 1, wherein said processor defines an inner boundary of the terrain clearance floor envelope proximate to the runway by summing the runway position quality factor and the altitude data quality factor, and wherein said processor defines an outer boundary of the terrain clearance floor envelope by summing the runway position quality factor, the altitude data quality factor, and a predetermined outer distance representing a predetermined distance from the inner boundary.

8. An apparatus according to claim 7, wherein said processor further defines at least one intermediate boundary of the terrain clearance floor envelope positioned on the envelope between the inner an outer boundaries, wherein said processor sums the runway position quality factor, the altitude data quality factor, and a predetermined intermediate distance representing a predetermined intermediate distance from the inner boundary.

9. An apparatus according to claim 7, wherein said processor further defines the terrain clearance floor envelope to have a preselected inner boundary altitude at the inner boundary, and a preselected outer boundary altitude at the outer boundary to thereby define a terrain clearance floor envelope having a slope defined by the inner and outer boundary altitudes and inner and outer boundaries defined by at least one of a runway position quality factor and an altitude data quality factor.

10. A method for generating a terrain clearance floor envelope about a selected runway for use in a ground proximity warning system to provide ground proximity alerts to an aircraft, wherein said method comprises the step of defining the terrain clearance floor envelope dependent upon at least two boundaries, and wherein said defining step defines at least one of the boundaries based on at least one of a runway position quality factor representing an uncertainty factor in the location of the selected runway and an altitude data quality factor representing an uncertainty factor in the altitude of the aircraft.

11. A method according to claim 10, wherein said defining step defines at least one of the boundaries of the terrain clearance floor envelope based on both the runway position quality factor and the altitude data quality factor.

12. A method according to claim 11, wherein said defining step comprises the step of summing the runway quality factor and the altitude data quality factor, wherein the sum of the factors defines at least one of the boundaries of the terrain clearance floor envelope.

13. A method according to claim 10, wherein said defining step comprises defining at least one of the boundaries of the terrain clearance floor envelope based on an aircraft position uncertainty factor representing an uncertainty in the position of the aircraft and at least one of a runway position quality factor and an altitude data quality factor.

14. A method according to claim 10, wherein the altitude data quality factor is a horizontal distance representing an uncertainty in the altitude of the aircraft converted to a horizontal error factor, and wherein said method further comprises, prior to said defining step, the step of generating the altitude data quality factor by dividing the uncertainty in the altitude of the aircraft by the tangent of the predetermined glideslope angle.

15. A method according to claim 10 further comprising, prior to said defining step, the step of accessing a stored database containing runway position quality factors for a plurality of candidate runways, and wherein said defining step comprises defining at least one of the boundaries of the terrain clearance floor envelope based on the runway position quality factor associated with the selected runway.

16. A method according to claim 12, wherein said summing step comprises:

a first summing step that sums the runway position quality factor and the altitude data quality factor to define an inner boundary of the terrain clearance floor envelope proximate to the runway; and a second summing step that sums the runway position quality factor, the altitude data quality factor, and a predetermined outer distance representing a predetermined distance from the inner boundary to define an outer boundary of the terrain clearance floor envelope.

17. A method according to claim 16, wherein said summing step further comprises a third summing step that sums the runway position quality factor, the altitude data quality factor, and a predetermined intermediate distance representing a predetermined intermediate distance from the inner boundary to thereby define at least one intermediate boundary of the terrain clearance floor envelope.

18. A method according to claim 16, wherein said defining step further comprises the steps of:

defining the terrain clearance floor envelope to have a preselected inner boundary altitude at the inner boundary; and defining the terrain clearance floor envelope to have a preselected outer boundary altitude at the outer boundary to thereby define a terrain clearance floor envelope having a slope defined by the inner and outer boundary altitudes and inner and outer boundaries defined by at least one of a runway position quality factor and an altitude data quality factor.

19. A computer program product for generating a terrain clearance floor envelope about a selected runway for use in a ground proximity warning system to provide ground proximity alerts to an aircraft, wherein the computer program product comprises:

a computer readable storage medium having computer readable program code means embodied in said medium, said computer-readable program code means comprising first computer instruction means for defining the terrain clearance floor envelope dependent upon at least two boundaries, and wherein said first computer instruction means defines at least one of the boundaries based on at least one of a runway position quality factor representing an uncertainty factor in the location of the runway and an altitude data quality factor representing an uncertainty factor in the altitude of the aircraft.

20. A computer program product according to claim 19, wherein said first computer instruction means defines at least one of the boundaries of the terrain clearance floor envelope based on both the runway position quality factor and the altitude data quality factor.

21. A computer program product according to claim 20, wherein said first computer instruction means comprises means for summing the runway quality factor and the altitude data quality factor, wherein the sum of the factors defines at least one of the boundaries of the terrain clearance floor envelope.

22. A computer program product according to claim 19, wherein said first computer instruction means defines at least one of the boundaries of the terrain clearance floor envelope based on an aircraft position uncertainty factor representing an uncertainty in the position of the aircraft and at least one of a runway position quality factor and an altitude data quality factor.

23. A computer program product according to claim 19, wherein the altitude data quality factor is a horizontal distance representing an uncertainty in the altitude of the aircraft converted to a horizontal error factor, and wherein said computer-readable program code means further comprises second computer instruction means for generating the altitude data quality factor by dividing the uncertainty in the altitude of the aircraft by the tangent of the predetermined glideslope angle.

24. A computer program product according to claim 19, wherein said computer-readable program code means further comprises third computer instruction means for accessing a stored database containing runway position quality factors for a plurality of candidate runways, and wherein said first computer instruction means defines at least one of the boundaries based on the runway position quality factor associated with the selected runway.

25. A computer program product according to claim 19, wherein said first computer instruction means comprises:

first summing means for summing the runway position quality factor and the altitude data quality factor to define an inner boundary of the terrain clearance floor envelope proximate to the runway; and second summing means that sums the runway position quality factor, the altitude data quality factor, and a predetermined outer distance representing a predetermined distance from the inner boundary to define an outer boundary of the terrain clearance floor envelope.

26. A computer program product according to claim 25, wherein said first computer instruction means further comprises third summing means that sums the runway position quality factor, the altitude data quality factor, and a predetermined intermediate distance representing a predetermined intermediate distance from the inner boundary to thereby define at least one intermediate boundary of the terrain clearance floor envelope.

27. A computer program product according to claim 25, wherein said computer-readable program code means further comprises:

fourth computer instruction means for defining the terrain clearance floor envelope to have a preselected inner boundary altitude at the inner boundary; and fifth computer instruction means for defining the terrain clearance floor envelope to have a preselected outer boundary altitude at the outer boundary to thereby define a terrain clearance floor envelope having a slope defined by the inner and outer envelope altitudes and an inner and outer boundary defined by at least one of a runway position quality factor and an altitude data quality factor.

* * * * *